United States Patent
Miyamoto et al.

(10) Patent No.: US 6,776,402 B2
(45) Date of Patent: Aug. 17, 2004

(54) LIQUID-ENCAPSULATED DAMPER MOUNT AND HYDRAULIC DAMPER MOUNTING STRUCTURE IN SUSPENSION OF AUTOMOBILE

(75) Inventors: Yasuo Miyamoto, Saitama (JP); Masashi Furuya, Saitama (JP)

(73) Assignees: Honda Giken Kogyo Kabushiki Kaisha, Tokyo (JP); Hokushin Corporation, Kanagawa (JP)

(*) Notice: Subject to any disclaimer, the term of this patent is extended or adjusted under 35 U.S.C. 154(b) by 0 days.

(21) Appl. No.: 09/992,278

(22) Filed: Nov. 19, 2001

(65) Prior Publication Data

US 2002/0145242 A1 Oct. 10, 2002

(30) Foreign Application Priority Data

Nov. 20, 2000 (JP) ........................................ 2000-352260
Feb. 28, 2001 (JP) ........................................ 2001-053637

(51) Int. Cl.[7] ........................... F16F 13/18; F16F 13/26; B60G 15/06
(52) U.S. Cl. ...................... 267/220; 267/292; 267/140.3
(58) Field of Search ................................. 267/220, 219, 267/140.3, 140.5, 292–294, 141–141.7, 153; 280/124.155, 124.177, 124.178, 124.169, 124.147, 124.157; 248/676, 562, 573, 619, 634, 632, 583; 403/225, 222; 188/321.11, 322.12

(56) References Cited

U.S. PATENT DOCUMENTS

| | | | |
|---|---|---|---|
| 2,869,811 A | * | 1/1959 | Boschi .................... 267/141.4 |
| 4,630,803 A | * | 12/1986 | Werner et al. |
| 4,842,258 A | * | 6/1989 | Misaka et al. |
| 4,981,287 A | * | 1/1991 | Cothenet .................... 267/292 |
| 5,078,370 A | * | 1/1992 | McClellan |
| 5,133,573 A | * | 7/1992 | Kijima et al. |
| 5,232,209 A | * | 8/1993 | de Fontenay ................ 267/220 |
| 5,330,166 A | * | 7/1994 | Aoki .......................... 267/220 |
| 5,467,971 A | * | 11/1995 | Hurtubise et al. .......... 267/220 |
| 5,678,808 A | * | 10/1997 | Claude et al. |
| 5,975,505 A | * | 11/1999 | Yoshimoto et al. ........... 267/33 |
| 6,082,749 A | * | 7/2000 | Smith et al. .......... 280/124.155 |
| 6,126,155 A | * | 10/2000 | Smith et al. ................ 267/220 |
| 6,592,112 B2 | * | 7/2003 | Bishop et al. .............. 267/220 |

FOREIGN PATENT DOCUMENTS

JP  5-149367 * 6/1993
JP  2001-280401 A * 10/2001

* cited by examiner

*Primary Examiner*—Douglas C. Butler
(74) *Attorney, Agent, or Firm*—Carrier, Blackman & Associates, P.C.; Joseph P. Carrier; William D. Blackman

(57) ABSTRACT

A mount for an upper portion of a vehicle damper suspension includes an elastic member interconnecting a bracket fixed to a vehicle body and a bracket fixed to a damper rod protruding from a damper case and formed into a tubular shape to surround an outer periphery of an upper portion of the bracket, a first liquid chamber defined in part by the elastic member, and a second liquid chamber defined in part by a diaphragm communicate with each other through a communication passage. The elastic member is shear-deformed vertically with the vertical movement of the damper rod. Thus, it is possible to reduce the vertical dimension of a damper mount, while ensuring a large amount of change in the volume of the first liquid chamber, as compared with a conventional damper mount in which the block-shaped elastic member provided at the upper portion of the damper case is deformed under compression or tension, to thereby change the volume of the first liquid chamber.

19 Claims, 22 Drawing Sheets

LIQUID-ENCAPSULATED DAMPER MOUNT AND HYDRAULIC DAMPER MOUNTING STRUCTURE IN SUSPENSION OF AUTOMOBILE

BACKGROUND OF THE INVENTION

1. Field of the Invention

The present invention relates to a liquid-encapsulated damper mount for supporting an upper portion of a damper for suspending a wheel of an automobile on a vehicle body.

The present invention also relates to a mounting structure for mounting a hydraulic damper used in a suspension of an automobile to a vehicle body, and particularly to a hydraulic damper mounting structure for mounting an upper portion of a hydraulic damper to a vehicle body with an anti-vibration rubber member interposed therebetween.

2. Description of the Related Art

One example of a conventional damper mount M for an automobile is shown in FIG. 18. This damper mount M is adapted to support an upper end of a hydraulic damper 11 for reducing a load input from a wheel in an opening 12a in a vehicle body 12 (on an upper wall of a wheel house), and includes a cylindrical damper case 13 in which a hydraulic cylinder is accommodated, and a damper rod 14 which is connected to a piston slidably received in the hydraulic cylinder and protrudes from an upper surface of the damper case 13 for sinking movement into the damper case 13. The damper rod 14 has a larger-diameter portion 14a and a smaller-diameter portion 14b from a side closer to the damper case 13, and an externally threaded portion 14c formed around an outer periphery of a tip end of the smaller-diameter portion 14b. A washer 15, a cup-shaped first bracket 16 with its lower surface opened, a collar 17 and a washer 18 are fitted above a step between the larger-diameter and smaller-diameter portions 14a and 14b and fastened by a nut 19 threadedly fitted over the externally threaded portion 14c.

A bump stopper 20 formed of an elastic member around an outer periphery of the larger-diameter portion 14a below the washer 15 is fitted within the first bracket 16 and has a lower surface opposed to an upper surface of the damper case 13 with a predetermined clearance provided therebetween. Therefore, when a large load is input to the wheel to retract the damper rod 14 largely into the damper case 13, the maximum amount of contraction of the hydraulic damper 11 can be restricted by the abutment of the upper surface of the damper case 13 against the lower surface of the bump stopper 20. A disk-shaped second bracket 21 having an opening 21a surround the periphery of the damper rod 14 is fixed to the periphery of the opening 12a in the vehicle body 12 by a plurality of bolts 22, and a suspension spring 24 is supported at its upper end on a spring seat 23 mounted to an outer periphery of a lower surface of the second bracket 21. A ring-shaped lower elastic member 25 is supported between the lower surface of the second bracket 21 and an upper surface of the first bracket 16, and a ring-shaped upper elastic member 26 is supported between an upper surface of the second bracket 21 and a lower surface of the washer 18.

Therefore, when a load is input from the wheel, a damping force is generated by the lower elastic member 25 and the upper elastic member 26 in addition to a damping force of the hydraulic damper 11 itself, and further, the inclination of an axis of the hydraulic damper 11 caused with the movement of the wheel can be absorbed by the resilient deformation of the lower and upper elastic members 25 and 26.

Another example of a conventional damper mount M for an automobile is shown in FIG. 19. Members or portions corresponding to those in the damper mount M described with reference to FIG. 18 are designated by like reference characters, and the duplicated description is omitted.

This damper mount M adopts a liquid-encapsulated structure in order to provide a damping force larger than that of the damper mount M described with reference to FIG. 18. More specifically, inner and outer peripheral surfaces of a block-shaped elastic member 27 are bonded by vulcanization to an outer peripheral surface of a collar 17 and an inner peripheral surface of a second bracket 21, respectively, and a lower surface of the elastic member 27 is supported on an upper surface of a first bracket 16. Outer peripheries of a partition plate 28, a diaphragm 29, a diaphragm holder 30 and a cap 31 are superposed in an opening 21b in the second bracket 21, and the outer periphery of the cap 31 is caulked to the second bracket 21, whereby the second bracket 21, the partition plate 28, the diaphragm 29 and diaphragm holder 30 and the cap 31 are coupled integrally to one another.

A first liquid chamber 32 having an operating liquid encapsulated therein is defined by the elastic member 27, the second bracket 21 and the partition plate 28, and a second liquid chamber 33 having an operating liquid encapsulated therein is defined by the partition plate 28 and the diaphragm 29. The first and second liquid chambers 32 and 33 communicate with each other through a communication passage 28a defined in the partition plate 28. Ethylene glycol, viscous silicone oil or the like is used as the operating liquid.

Therefore, when a load is input from a wheel, a damping force is generated by the elastic member 27 in addition to a damping force of the hydraulic damper 11 itself, and further, a damping force is exhibited by the operating liquid passed through the communication passage 28a. More specifically, when a damper rod 14 is offset upwards, causing the elastic member 27 to be compressed and deformed, the volume of the first liquid chamber 32 is decreased. Therefore, the operating liquid forced out of the first liquid chamber 32 is passed through the communication passage 28a into the second liquid chamber 33 to expand the diaphragm 29. On the other hand, when the damper rod 14 is offset downwards, causing the elastic member 27 to be pulled and deformed, the volume of the first liquid chamber 32 is increased. Therefore, the diaphragm 29 of the second liquid chamber 33 is shrunk due to vacuum, whereby the operating liquid is passed through the communication passage 28a and drawn into the first liquid chamber 32. In this manner, the operating liquid in the first liquid chamber 32 and the second liquid chamber 33 is passed through the communication passage 28a alternately between the first liquid chamber 32 and the second liquid chamber 33 with the vertical movement of the damper rod 14, and at this time, the damping force is generated.

The conventional liquid-encapsulated damper mount M described with reference to FIG. 19 suffers from the following problem: The first liquid chamber 32, the partition plate 28, the second liquid chamber 33, the diaphragm 29 and the cap 31 are disposed above the upper end of the damper rod 14 and for this reason, the vertical size of the damper mount M is increased, and also these members are passed through the vehicle body 12 (the upper wall of the wheel house) to protrude largely into an engine room.

In an automobile or the like in general, a suspension as shown in FIG. 20 is provided in order to receive a load applied between a vehicle body and a wheel and to moderate the shock transmitted from a wheel to a vehicle body to improve the riding comfort. FIG. 20 is a perspective view showing a suspension S on a front side. The suspension S usually comprises a knuckle 102 supporting an axle, an upper arm 103 coupled to the knuckle 102 and connected to a wheel house on the vehicle body, a lower arm 104 coupled to the knuckle 102 and connected to a sub-frame on the vehicle body, a hydraulic damper 106 as a damper coupled to the lower arm 104 by a damper fork and mounted at its upper portion to an upper portion of the wheel house by bolts 108 through a damper mount 107 (the detail of which will be described hereinafter), and a coil spring 109 disposed to surround a periphery of the hydraulic damper 106 and adapted to support a load of the vehicle body together with the hydraulic damper 106.

Not only a vertical load based on the weight of the vehicle body is applied to the suspension S, but also a lateral load is applied to the suspension S in accordance with a steering force during turning movement of the vehicle or a state of a road or in accordance with an operational state of the automobile during turning movement, acceleration or braking of the automobile. A measure is taken so that the lateral load is received by each of the upper and lower arms 103 and 104, whereby the influence of the lateral load to the hydraulic damper 106 is possibly reduced. The hydraulic damper 106 is generally formed as a strut-type long member extending in a lengthwise direction (an axial direction). The hydraulic damper 106 is adapted to absorb a shock mainly from a road surface by a damping effect provide by an internal hydraulic pressure in response with the expansion or contraction of a strut to inhibit the vibration of the vehicle. The hydraulic damper 106 is mounted to the wheel house through the damper mount 107 and hence, the transmission of a high-frequency vibration from the road surface to the vehicle body is cut off.

FIGS. 21 and 22 show conventional structures of mounting of the upper portion of the hydraulic damper 106 to the wheel house which is a structure on the vehicle body. The conventional mounting structure 180 shown in FIG. 21 uses a damper mount 185 including an anti-vibration rubber member bonded by vulcanization. A larger-diameter portion 112, a step 113 and a smaller-diameter portion 114 are formed on a piston rod 111 protruding on the upper portion of the hydraulic damper 106 in the named order towards a tip end of the piston rod 111, and an externally threaded portion 115 is formed at a foremost tip end of the piston rod 111. A locking member 116 made of a steel material is fitted over the smaller-diameter portion 114, so that it is seated on a step 113. A bump stopper 118 fitted over the larger-diameter portion 112 and adhered to the locking member 116 is disposed between the locking member 116 and an upper surface 117 of a cylinder 106a of the hydraulic damper 106 with a clearance defined between the bump stopper 118 and the upper surface 117 of the cylinder. When the hydraulic damper 106 is contracted excessively, the upper surface 117 of the cylinder is put into abutment against the bump stopper 118, thereby dampening an excessive load. An outer periphery of the bump stopper 118 is covered with a tubular dust cover 119 with only its lower portion opened.

The damper mount 185 is comprised of a collar 186 fitted over the smaller-diameter portion 114 of the piston rod 111, a mounting plate (a base plate) 187 mounted to the wheel house by screwing a mounting bolt 108 into the wheel house on the vehicle body, and an anti-vibration rubber member 189 disposed and bonded by vulcanization between an outer peripheral surface of the collar 186 and an inner peripheral surface of a folded-back portion 188 of the mounting plate 187. The damper mount 185 is assembled to the hydraulic damper 106 by screwing a nut 123 over the externally threaded portion 115 of the piston rod 111 having the collar 186 fitted thereover and clamping the anti-vibration rubber member 189 between a retaining plate 122 and a top surface 120 of the dust cover 119. The anti-vibration rubber member 189 of the damper mount 185 is curved in its section to come into close contact with the folded-back portion 188 and hence, can transmit not only a load in an axial direction of the hydraulic damper 106 but also a load in a radial direction perpendicular to the piston rod 111. The anti-vibration rubber member 189 is of a vulcanization-bonded type and has a stable characteristic and hence, such a damper mount 185 is used mainly for a high-grade automobile.

The conventional mounting structure 190 shown in FIG. 22 uses a damper mount 195 having an anti-vibration rubber member which is not bonded by vulcanization. The structure of a hydraulic damper 106 is similar to the structure shown in FIG. 21 and hence, like components and portions are designated by a like reference characters and the duplicated description is omitted. The structure on the side of a vehicle body comprises a first mounting plate 196 clamped to a wheel house by mounting bolts 108, and a second mounting plate 197 superposed on the first mounting plate 196. The first mounting plate 196 comprises a curved portion 196a and a flat portion 196b extending inwards from the curved portion 196a. The second mounting plate 197 comprises a curved portion 197a and a flat portion 197b, which are of shapes symmetric with the curved portion 196a and the flat portion 196b of the first mounting plate 196.

The damper mount 195 comprises a first anti-vibration rubber member 198 mounted between the top surface 120 of the dust cover 119 and the first mounting plate 196, and a second anti-vibration rubber member 199 mounted between the retaining plate 122 and the second mounting plate 197. The anti-vibration rubber members 198 and 199 are umbrella-shaped rubber members disposed to surround the outer periphery of the collar 186, so that their opened sides are opposed to each other. An annular portion of each of the anti-vibration rubber members 198 and 199 is of a substantially egg-shape in section, so that an inner peripheral edge corresponding to a pointed end abuts against a corner formed between the collar 186 and the top surface 120 of the dust cover or the retaining plate 122, and an outer peripheral edge corresponding to a rounded end abuts against the curved portion 196a of the first mounting plate 196 or the curved portion 197a of the second mounting plate 197.

The damper mount 195 is assembled to the hydraulic damper 106 by screwing a nut 123 over the externally threaded portion 115 of the piston rod 111 having the collar 186 fitted thereover and clamping the anti-vibration rubber members 198 and 199 between the retaining plate 122 and the dust cover 119. The anti-vibration rubber members 198 and 199 of the damper mount 195 are in close contact with the curved portions 196a and 197a (each curved in section) of the first and second mounting plates 196 and 197 and hence, can transmit not only a load in an axial direction of the hydraulic damper 106 but also a load in a radial direction perpendicular to the piston rod 111. The anti-vibration rubber members 198 and 199 are not bonded by vulcanization to any of the first mounting plate 196, the second mounting plate 197, the collar 186 and the dust cover 119 and are produced at a low cost and hence, such a damper mount 195 is used for a standard automobile.

Desired functions provided by the damper mount are a function of maintaining the position of the hydraulic damper in the axial direction of the hydraulic damper, i.e., a substantially vertical direction, and a direction perpendicular to the axis of the hydraulic damper, i.e., in a lateral direction and a longitudinal direction, a function of permitting the oscillating movement of the hydraulic damper relative to the vehicle body, and an anti-vibration function against the input of vibration in all these directions. The mounting structures shown in FIGS. 21 and 22 are designed so that these functions can be satisfied. For example, the maintaining function in the direction perpendicular to the axis exerted by the vulcanization-bonded type damper mount 185 shown in FIG. 21 is provided at a portion of the anti-vibration rubber member having an axial thickness of the folded-back portion 188 of the mounting plate 187. Therefore, the regulation of the maintaining function is performed by regulating the axial thickness of the folded-back portion 188. The damper mount 195, which is not of the vulcanization-bonded type and which is shown in FIG. 22, has a maintaining function in the direction perpendicular to the axial direction, which is provided by regulating the opening angles of the umbrella-shaped anti-vibration rubber members 198 and 199.

However, any of these structures suffer from the following problem: The maintaining function in the longitudinal and lateral direction which is the direction perpendicular to the axis of the hydraulic damper is obtained above the hydraulic damper. For this reason, it is difficult to reduce the length of the entire damper assembly including the hydraulic damper and the damper mount, i.e., the height of the entire damper assembly in a state in which it has been applied to the automobile.

SUMMARY OF THE INVENTION

Accordingly, it is an object of the present invention to reduce the vertical size of the damper mount.

To achieve the above object, according to a first aspect and feature of the present invention, there is provided a liquid-encapsulated damper mount for supporting an upper portion of a damper for suspending a wheel of an automobile on a vehicle body, comprising an elastic member connecting a bracket fixed to the vehicle body to the upper portion of the damper, a first liquid chamber defined at least in part by the elastic member, a second liquid chamber defined at least in part by a diaphragm, and a communication passage permitting the first and second liquid chambers to communicate with each other, wherein the elastic member is formed into a tubular shape to surround an outer periphery of the upper portion of the damper so that it is shear-deformed vertically with the vertical movement of the damper relative to the bracket fixed to the vehicle body, to thereby increase and decrease the volume of the first liquid chamber.

With the above arrangement, the elastic member connecting the bracket on the vehicle body to the upper portion of the damper is formed into the tubular shape to surround the outer periphery of the upper portion of the damper so that it is shear-deformed vertically with the vertical movement of the damper to change the volume of the first liquid chamber. Therefore, it is possible to reduce the vertical size of the damper mount, while ensuring a large amount of change of the volume of the first liquid chamber, as compared with the conventional damper mount in which the block-shaped elastic member mounted at the upper portion of the damper can be deformed in a compressed and pulled manner to change the volume of the first liquid chamber.

According to a second aspect and feature of the present invention, in addition to the first feature, the diaphragm is located below the elastic member and inside a suspension spring placed around an outer periphery of the damper.

With the above arrangement, the diaphragm is located below the elastic member and hence, the volume of the second liquid chamber defined by the diaphragm can be ensured at a large value. In addition, the diaphragm is located inside the suspension spring and hence, when the damper is assembled to the vehicle body, it is difficult to damage the diaphragm by a tool or the like.

According to a third aspect and feature of the present invention, there is provided a structure for mounting a hydraulic damper used in a suspension of an automobile on a vehicle body, comprising a first rubber member disposed between an axial end of the hydraulic damper and the vehicle body and adapted to receive a load in an axial direction of the hydraulic damper, and a second rubber member disposed between an outer peripheral portion of the hydraulic damper and the vehicle body and adapted to receive a load in a radial direction perpendicular to an axis of the hydraulic damper.

With the above arrangement, a maintaining function in the axial direction of the damper mount and a maintaining function in a direction perpendicular to the axis are separated in the structure of mounting of the hydraulic damper on the vehicle body. Therefore, the first rubber member disposed between the axial end of the hydraulic damper and the vehicle body receives a load in the axial direction of the hydraulic damper and exhibits the maintaining function in the axial direction of the damper mount, and the second rubber member disposed between the outer peripheral portion of the hydraulic damper and the vehicle body receives a load in the radial direction perpendicular to the axis and exhibits a maintaining function in the radial direction sideways of the hydraulic damper. Therefore, The distance between the axial end of the hydraulic damper and the vehicle body is a length only corresponding to the thickness of the first rubber member, and the length of the entire damper assembly can be shortened.

According to a fourth aspect and feature of the present invention, there is provided a structure for mounting a hydraulic damper used in a suspension of an automobile on a vehicle body, comprising a first rubber portion disposed between an axial end of the hydraulic damper and the vehicle body and adapted to receive a load in an axial direction of the hydraulic damper, and a second rubber portion disposed between an outer peripheral portion of the hydraulic damper and the vehicle body and adapted to receive a load in a radial direction perpendicular to an axis of the hydraulic damper, wherein the first and second rubber portions are formed integrally with each other.

With the above arrangement, the first and second rubber members are formed integrally with each other and hence, the number of parts can be reduced, leading to a reduction in cost, and the handling of the anti-vibration rubber members is facilitated during assembling and positioning thereof.

According to a fifth aspect and feature of the present invention, in addition to the third feature, a clearance is defined between the outer peripheral portion of the hydraulic damper and the second rubber member.

With the above arrangement, the clearance is defined between the outer peripheral portion of the hydraulic damper and the second rubber member. In those instances when the hydraulic damper receives a load in the radially inward direction intersecting the axial direction, the radially inward displacement of the hydraulic damper is equal to or smaller than the clearance, when the load is small, as is a road noise. Therefore, the load is not transmitted to the vehicle body because of the clearance, to provide a vibration-insulating state.

According to a sixth aspect and feature of the present invention, in addition to the third feature, the first and second rubber members are retained in such a manner that they are sandwiched between the hydraulic damper and the vehicle body.

With the above arrangement, the first and second rubber members are retained in such a manner that they are sandwiched between the hydraulic damper and the vehicle body and hence, the working of members for the vehicle body can be carried out in advance, and the mounting of the hydraulic damper can be achieved easily.

A hydraulic damper 11 in each of first to fifth embodiments corresponds to the damper of the present invention; a second bracket 52 in each of first to fifth embodiments corresponds to the bracket of the present invention; and a second elastic member 56 in each of first to fifth embodiments corresponds to the elastic member of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 3 show a first embodiment of the present invention, wherein

FIG. 1 is a perspective view of a rear suspension in an automobile;

FIG. 2 is a vertical sectional view of a liquid-encapsulated damper mount (an enlarged sectional view taken along a line 2—2 in FIG. 1);

FIG. 3 is a view for showing a method for injecting an operating liquid into liquid chambers;

FIGS. 4 and 5 show a second embodiment of the present invention, wherein

FIG. 4 is a vertical sectional view of a liquid-encapsulated damper mount;

FIG. 5 is a view for showing a method for injecting an operating liquid into liquid chambers;

FIGS. 10 and 11 show a sixth embodiment of the present invention, wherein

FIG. 10 is a vertical sectional view showing a structure of mounting of a hydraulic damper;

FIG. 11 is an exploded view showing the mounting structure shown in FIG. 10 in a state before assembling;

FIGS. 12 and 13 show a seventh embodiment of the present invention, wherein

FIG. 12 is a vertical sectional view showing a structure of mounting of a hydraulic damper;

FIG. 13 is an exploded view showing the mounting structure shown in FIG. 12 in a state before assembling;

FIGS. 15 and 16 show a ninth embodiment of the present invention, wherein

FIG. 15 is a vertical sectional view showing a structure of mounting of a hydraulic damper;

FIG. 16 is an exploded view showing the mounting structure shown in FIG. 15 in a state before assembling;

DESCRIPTION OF THE PREFERRED EMBODIMENTS

A first embodiment of the present invention will now be described with reference to FIGS. 1 to 3.

Figure 1:
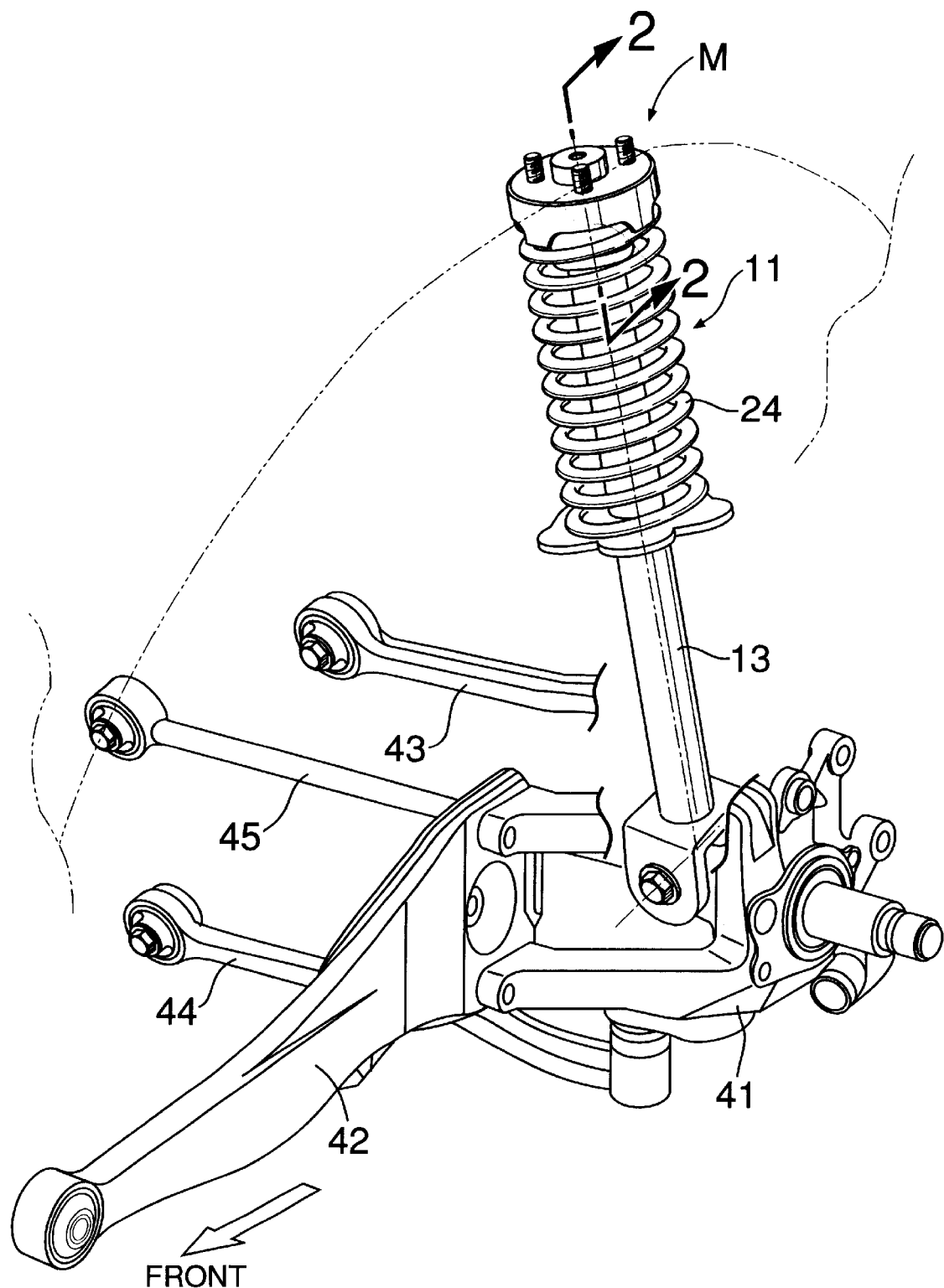

FIG. 1 shows a suspension for a left rear wheel of an automobile. A knuckle 41 for rotatably supporting a wheel (not shown) is connected to a vehicle body by a radial rod 42 extending forwards and by an upper arm 43, a front lower arm 44 and a rear lower arm 45, which extend laterally. The vertical movement of the knuckle 41 is buffered by a hydraulic damper 11 integrally provided with a suspension spring 24. A well-known hydraulic damper 11 is adapted to generate a flow of an oil by a cylinder and a piston moved relative to each other in response to the vertical movement of the knuckle 41 and to generate damping force by a resisting force produced when the oil passes through a hydraulic valve having a constriction. The hydraulic damper 11 is supported at its upper end on the vehicle body through a liquid-encapsulated damper mount M.

The structure of the liquid-encapsulated damper mount M according to the first embodiment will be described below with reference to FIG. 2. The damper mount M is intended to support the upper end of the hydraulic damper 11 including a damper case 13 and a damper rod 14 in an opening 12a in the vehicle body 12. A larger-diameter portion 14a and a smaller-diameter portion 14b are formed on the damper rod 14 in the named order from a side nearer to the damper case 13. A bottom washer 15, a cap-shaped first bracket 16 with its lower surface opened, a collar 17 and a top washer 18 are fitted above a step between the larger-diameter portion 14a and the smaller-diameter portion 14b and fastened by a nut 19 threadedly fitted over female threads 14c of the smaller-diameter portion 14b. A bump stopper 20 formed of an elastomer is fitted over an outer periphery of the larger-diameter portion 14a below the bottom washer 15. A lower surface of the bump stopper 20 is opposed to an upper surface of the damper case 13, with a predetermined gap existing therebetween.

A first annular elastic member 51 bonded by vulcanization to an outer periphery of the collar 17 is fixed between an upper surface of the first bracket 16 and a lower surface of the top washer 18. A second bracket 52 comprises an upper bracket section 53 and a lower bracket section 54 bonded integrally to each other by welding, and is fixed to a peripheral edge of the opening 12*a* in the vehicle body 12 by a plurality of bolts 22 passed through the upper and lower bracket sections 53 and 54. An inner periphery of the upper bracket section 53 of the second bracket 52 is integrally embedded in the first elastic member 51. On the other hand, a collar 55 is press-fitted around an outer periphery of the first bracket 16, and a substantially cylindrical second elastic member 56 has an inner peripheral surface bonded by vulcanization to an outer peripheral surface of the collar 55, and an outer peripheral surface bonded by vulcanization to an inner peripheral surface of the lower bracket section 54 of the second bracket 52. A diaphragm 57 integrally formed at a lower portion of the second elastic member 56 is fixed at its lower end to a lower end of the outer periphery of the first bracket 16 by a fixing ring 58.

A first liquid chamber 59 is defined by the first bracket 16, the second bracket 52, the first elastic member 51 and the second elastic member 56, and a second liquid chamber 60 is defined by the first bracket 16, the second elastic member 56 and the diaphragm 57. The first and second liquid chambers 59 and 60 communicate with each other through a communication passage 55*a* defined in the inner peripheral surface of the collar 55.

A technique for injecting an operating liquid into the first and second liquid chambers 59 and 60 in the liquid-encapsulated damper mount M will be described below with reference to FIG. 3.

In a state in which an assembly comprising the first bracket 16, the second bracket 52, the first elastic member 51 and the second elastic member 56 provided integrally to one another has been turned upside down, an operating-liquid injecting jig 61 is mounted from above the assembly. The operating-liquid injecting jig 61 is a cup-shaped member with its lower surface opened, and includes a seal member 62 provided on an outer periphery of its lower end to abut against the outer peripheral surface of the lower bracket section 54, and a seal member 63 provided on an outer side of a cylindrical wall 61*a* integrally formed on its inner surface to abut against the lower end (the upper end in FIG. 3) of the first bracket 16. At this time, the lower end (the upper end in FIG. 3) of the diaphragm 57 integral with the second elastic member 56 is not fixed by the fixing ring 58, and the second liquid chamber 60 is opened.

An operating-liquid injection chamber 61*b* in the mounted operating-liquid injecting jig 61 is in a state in which it communicates with the second liquid chamber 60 and the first liquid chamber 59 and has been sealed by the seal members 62 and 63. An operating-liquid injecting pipe 64 and an air-discharging pipe 65 are connected to the operating-liquid injection chamber 61*b*. Therefore, air in the second liquid chamber 60 and the first liquid chamber 59 is evacuated through an air discharge pipe 65 connected to a vacuum source (not shown) and then, an operating liquid is injected into the second liquid chamber 60 and the first liquid chamber 59 connected to an operating liquid tank (not shown). In this manner, the operating liquid can be injected in a short time, while preventing any air from remaining in the second liquid chamber 60. Subsequently, the operating-liquid injecting jig 61 is retracted upwards and then, the diaphragm 57 is clamped by the fixing ring 58 to close the second liquid chamber 60. It is possible to further reliably prevent the air from remaining in chamber 60 by repeating the evacuation of the air and the injection of the operating liquid a plurality of times.

Therefore, when a load is input from the wheel, a damping force can be provided by the resilient deformation of the first and second elastic members 51 and 56 in addition to a damping force of the hydraulic damper 11 itself and further, a damping can be also exhibited by the operating liquid flowing through the communication passage 55*a*. More specifically, when the damper rod 14 is offset upwards, the first elastic member 51 is compressed vertically, and at the same time, the second elastic member 56 is deformed resiliently by a vertical shearing force to reduce the volume of the first liquid chamber 59. Therefore, the operating liquid forced out of the first liquid chamber 59 is passed through the communication passage 55*a* into the second liquid chamber to expand the diaphragm 57. On the other hand, when the damper rod 14 is offset downwards, the first elastic member 51 is stretched vertically and at the same time, the second elastic member 56 is deformed resiliently by a vertical shearing force to increase the volume of the first liquid chamber 59. Therefore, the diaphragm 57 in the second liquid chamber 60 is shrunk due to a negative pressure, whereby the operating liquid passes through the communication passage 55*a* and drawn into the first liquid chamber 59. In this manner, the operating liquid in the first liquid chamber 59 and the second liquid chamber 60 is passed through the communication passage 55*a* alternately between the first liquid chamber 59 and the second liquid chamber 60 with the vertical movement of the damper rod 14, and at this time, the damping force is generated.

Figure 2:
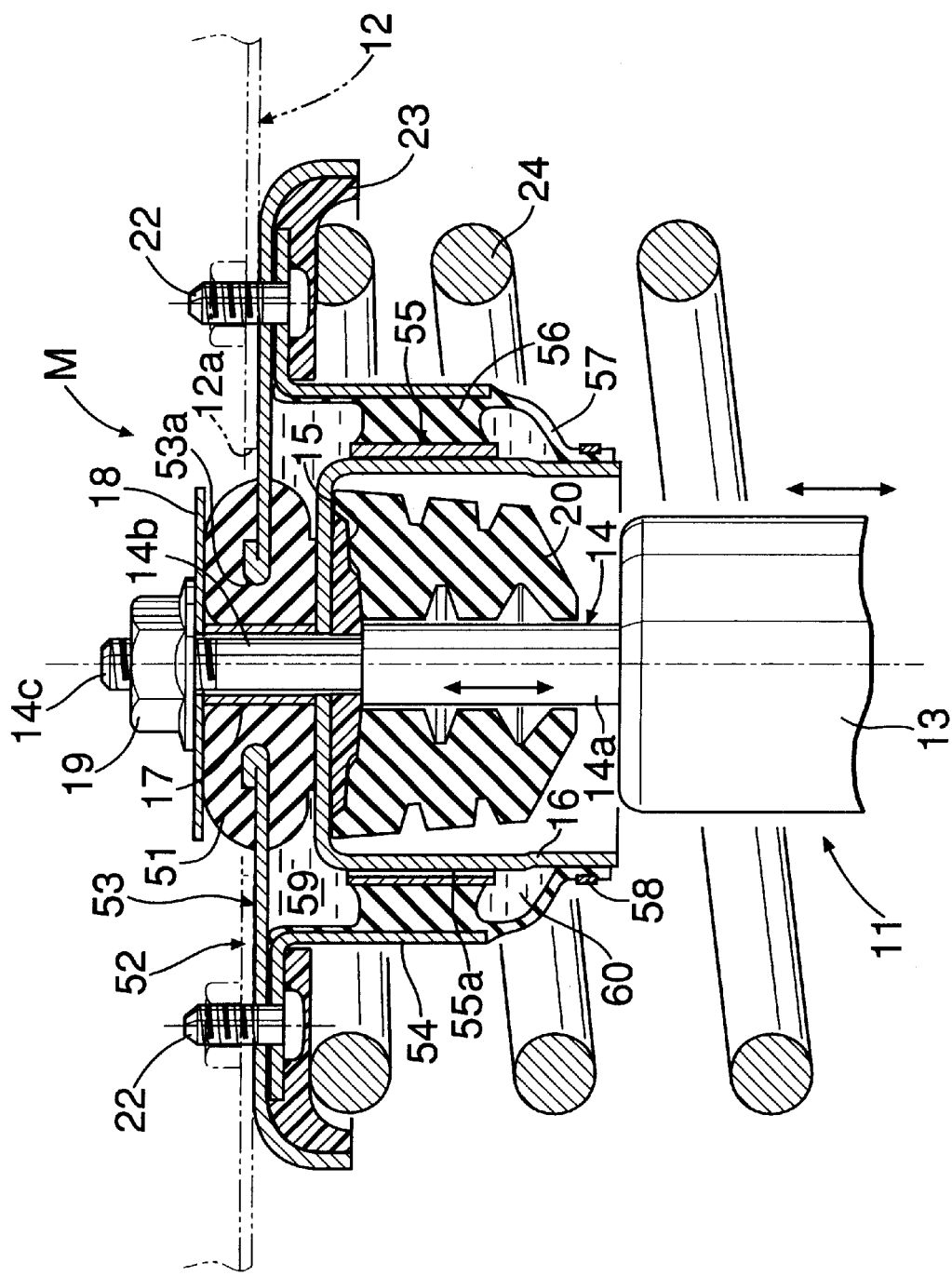
Figure 3:
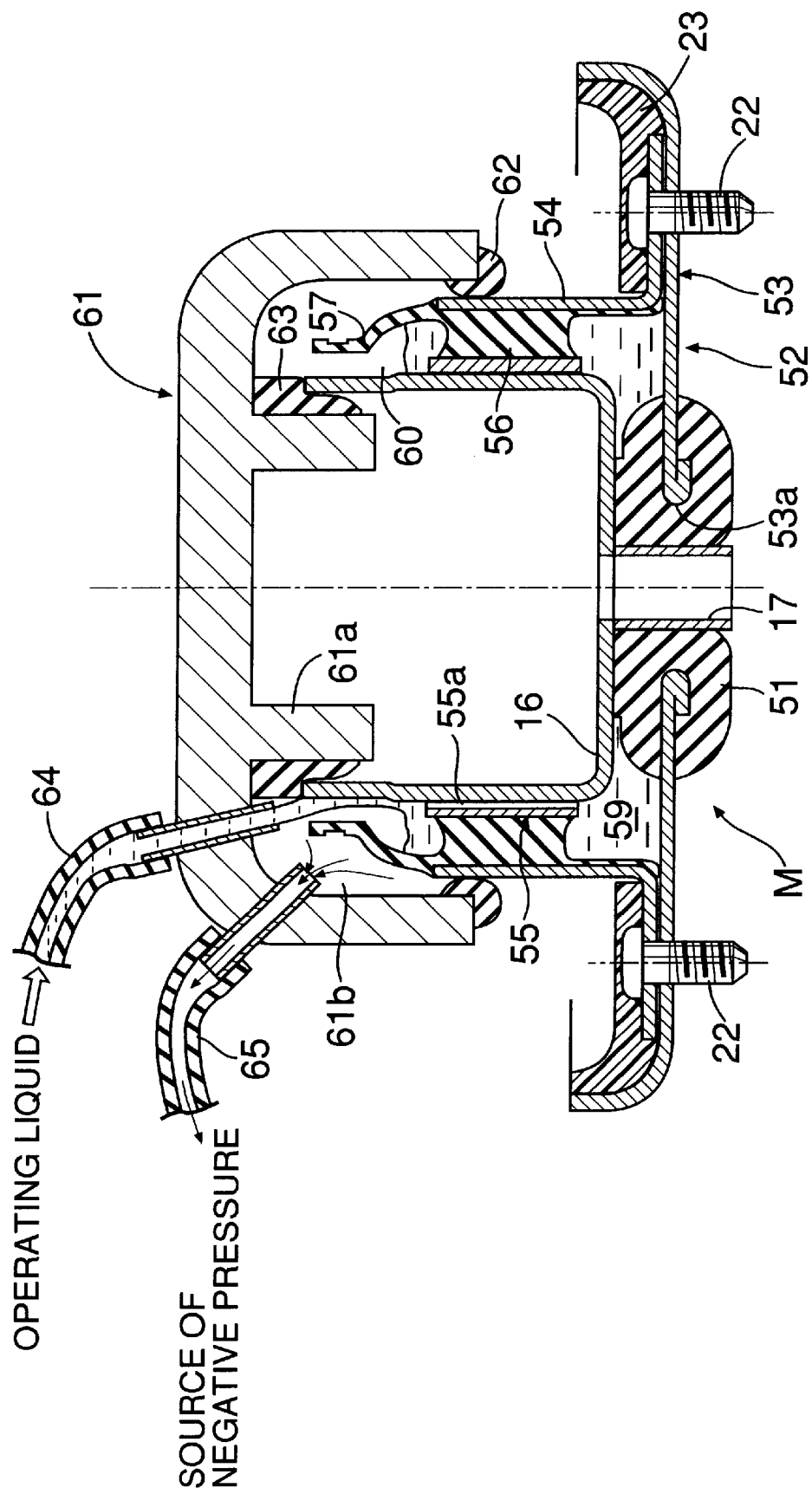
Figure 19:
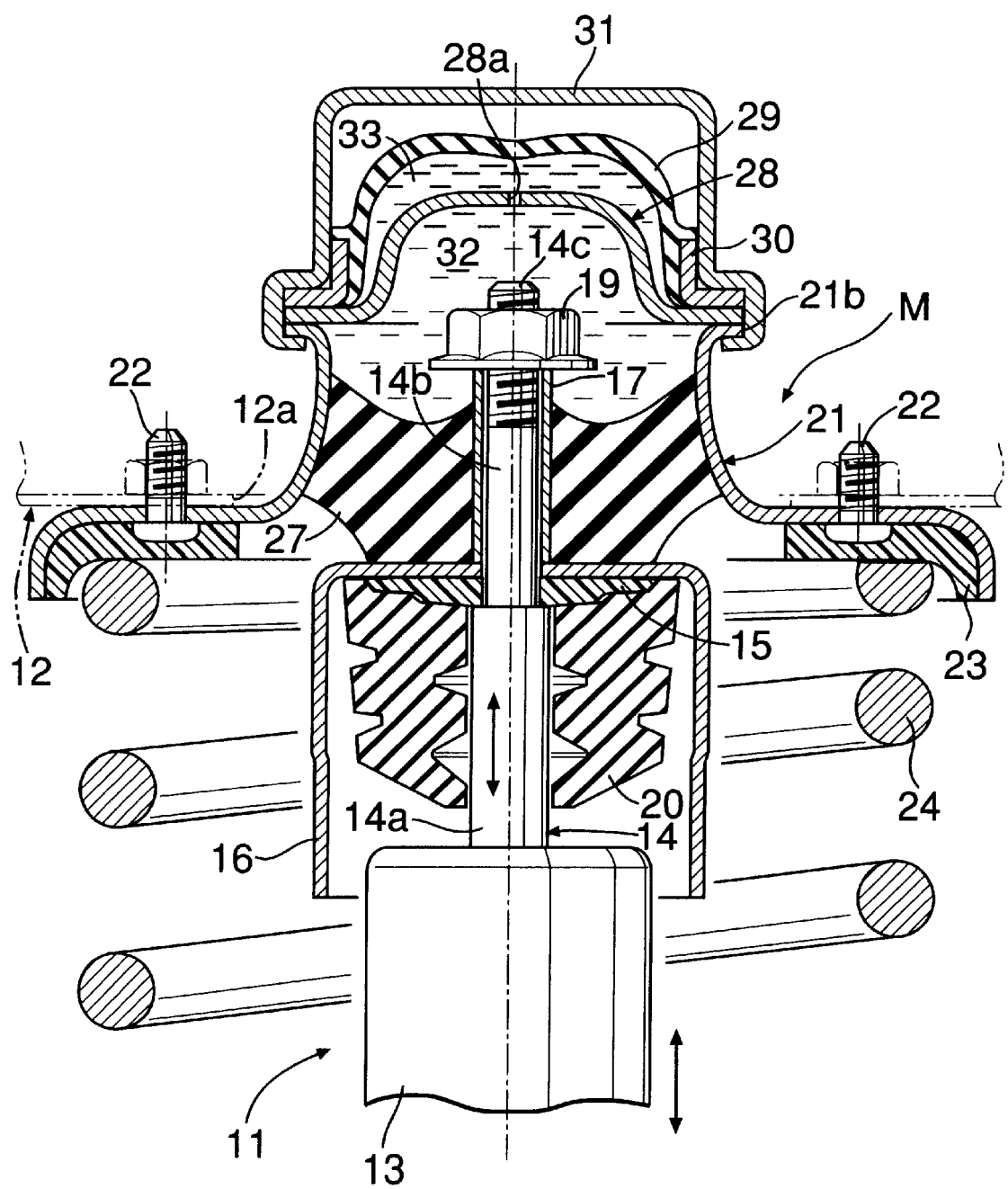
FIG. 19 is a vertical sectional view of the conventional liquid-encapsulated damper mount.
Figure 20:
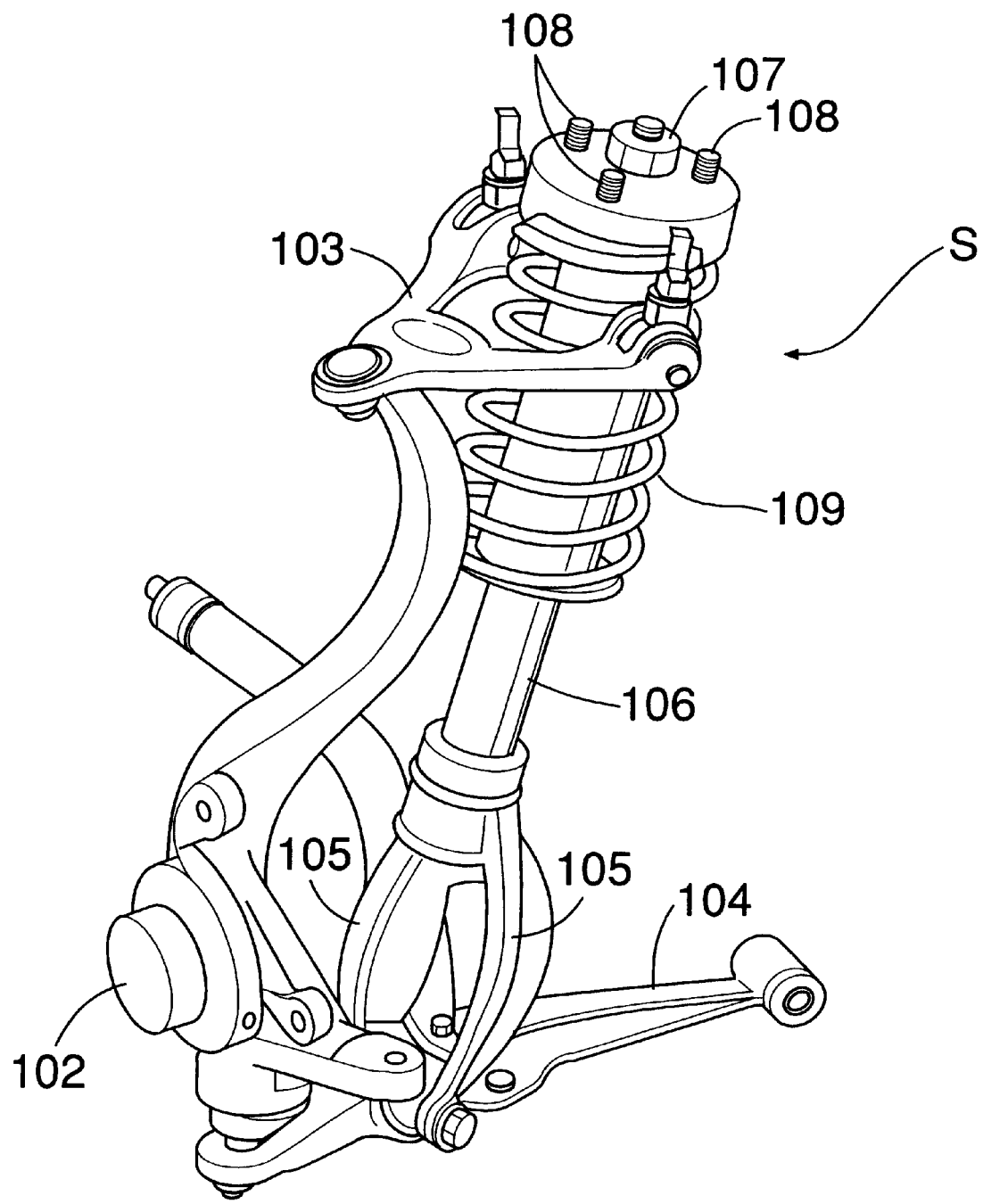
FIG. 20 is a perspective view showing one example of a suspension to which the structure of mount of the hydraulic damper according to the present invention is applied.

As can be seen from the comparison of FIG. 2 showing the present embodiment with FIG. 19 showing the prior art, in the liquid-encapsulated damper mount according to the present embodiment, the second cylindrical elastic member 56 most contributing to the variation in volume of the first liquid chamber 59 is disposed to surround the outer periphery of the first bracket 16. Therefore, the first liquid chamber 59 and the second liquid chamber 60 can be provided at locations lower in level than the upper end of the damper rod 14 and hence, the vertical dimension of the damper mount M of the hydraulic damper 11 can be reduced. Even if the hydraulic damper 11 is inclined relative to the vehicle body, such inclination can be absorbed by the deformation of the first elastic member 51 and the second elastic member 56. Moreover, even when the second elastic member 56 should be broken, there not a possibility that the hydraulic damper 11 will fall into a wheel house, because the damper rod 14 is connected to the vehicle body 12 by the first elastic member 51.

In addition, a reduction in cost can be provided by the forming the diaphragm 57 integrally with the second elastic member 56. Further, since the first liquid chamber 59 is defined to surround the outer periphery of the first bracket 16, a large volume of the first liquid chamber 59 can be ensured, and in addition, since the diaphragm 57 is provided below the second elastic member 56, a large volume of the second liquid chamber 60 demarcated by the diaphragm 57 can be ensured. Yet further, since the diaphragm 57 is provided inside the suspension spring 24, it is difficult to damage the diaphragm 57 by a tool or the like at the time when the hydraulic damper 11 is assembled to the vehicle body.

A second embodiment of the present invention will now be described with reference to FIGS. 4 and 5.

Figure 4:
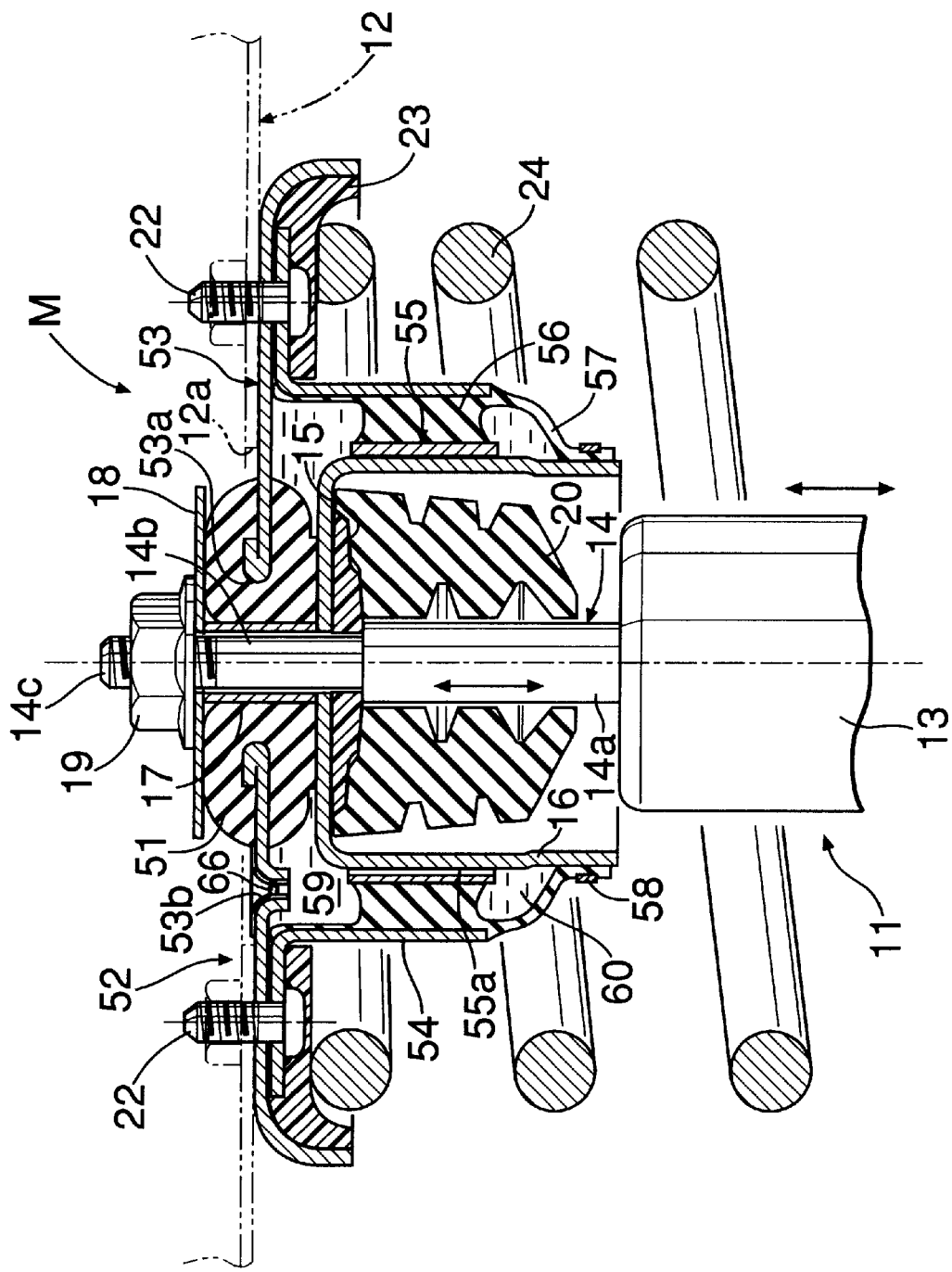

As shown in FIG. 4, in a damper mount M according to the second embodiment, an operating-liquid injecting bore 53*b* is provided in an upper bracket section 53 of a second bracket 52. The operating-liquid injecting bore 53*b* is closed by press-fitting a ball 66 after injection of the operating liquid into the first liquid chamber 59 and the second liquid chamber 60. The other structure and function are the same as in the first embodiment.

Figure 5:
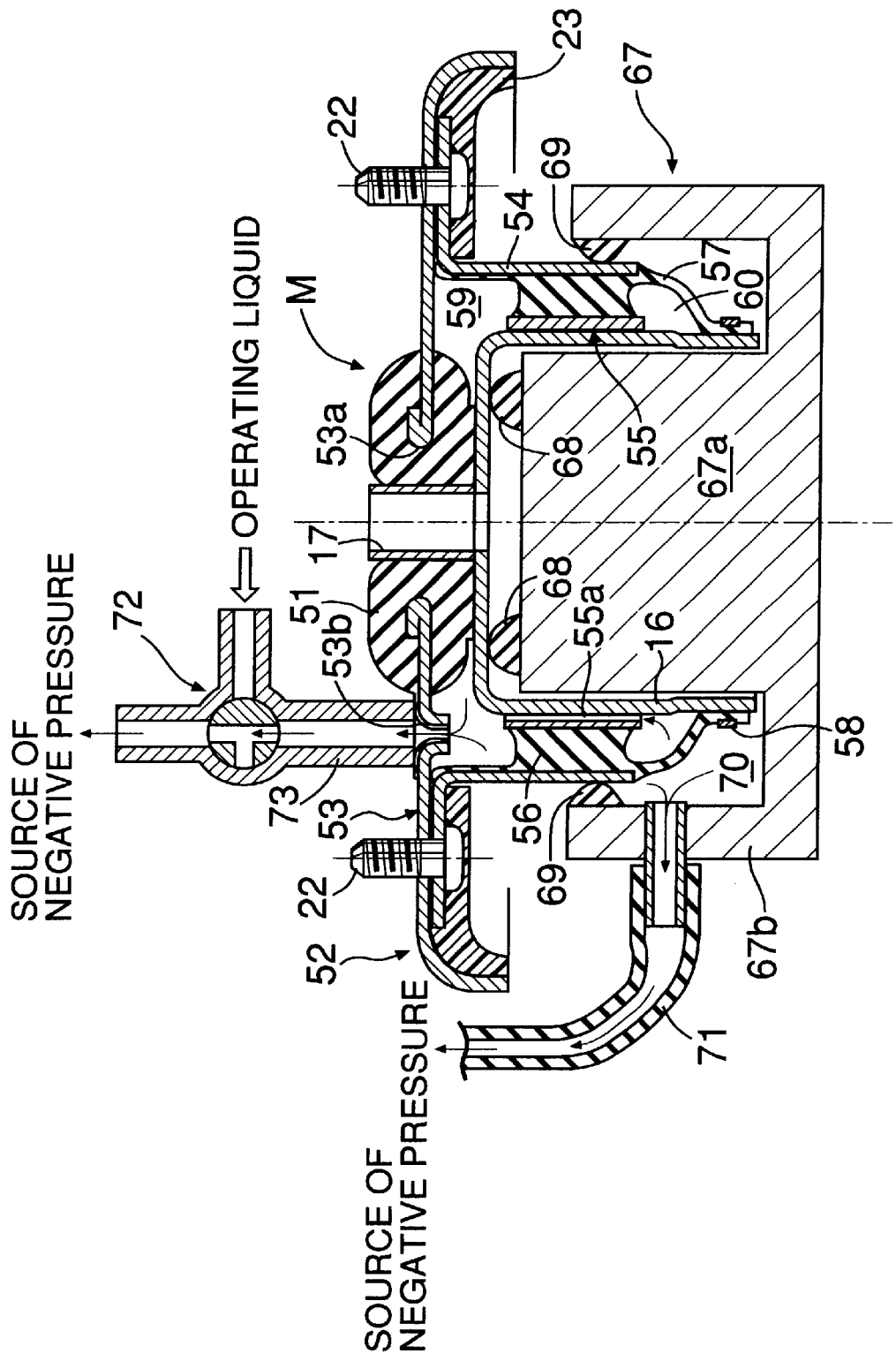

FIG. 5 shows a technique for injecting the operating liquid into the first liquid chamber 59 and the second liquid chamber 60 in the damper mount M in the second embodiment.

An operating-liquid injecting jig 67 is adapted to supporting the assembly comprising the first bracket 16, the second bracket 52, the first elastic member 51 and the second elastic member 56 which are provided integrally with one another in an upright state. The operating-liquid injecting jig 67 includes a columnar support portion 67a fitted into the first bracket 16, and a cylindrical peripheral wall 67b fitted over an outer periphery of the lower bracket section 54 of the second bracket 52. A seal member 68 mounted on an upper surface of the support portion 67a abuts against the inner surface of the upper portion of the first bracket 16 to seal the upper of the first bracket 16, and a seal member 69 abuts against the outer peripheral surface of the lower bracket section 54 to seal the lower bracket section 54, thereby defining a vacuum chamber 70 facing the diaphragm 57. An air discharge pipe 71 leading to a vacuum source is connected to the vacuum chamber 70. A nozzle 73 capable of being put selectively into communication with the vacuum source and the operating liquid tank by a selector valve 72 is mounted to abut against the operating-liquid injecting bore 53b in the upper bracket section 53.

Therefore, after suction of the air in the first liquid chamber 59 and the second liquid chamber 60 by the nozzle 73, the operating liquid can be injected in a short time into the first liquid chamber 59 and the second liquid chamber 60 by the nozzle 73 by switching the selector valve 72 and in addition, the incorporation of the air into the operating liquid can be prevented. When the air in the first liquid chamber 59 and the second liquid chamber 60 is sucked by the nozzle 73, the breaking of the diaphragm 57 can be prevented by depressurizing the vacuum chamber 70 synchronously with the suction.

Figure 6:
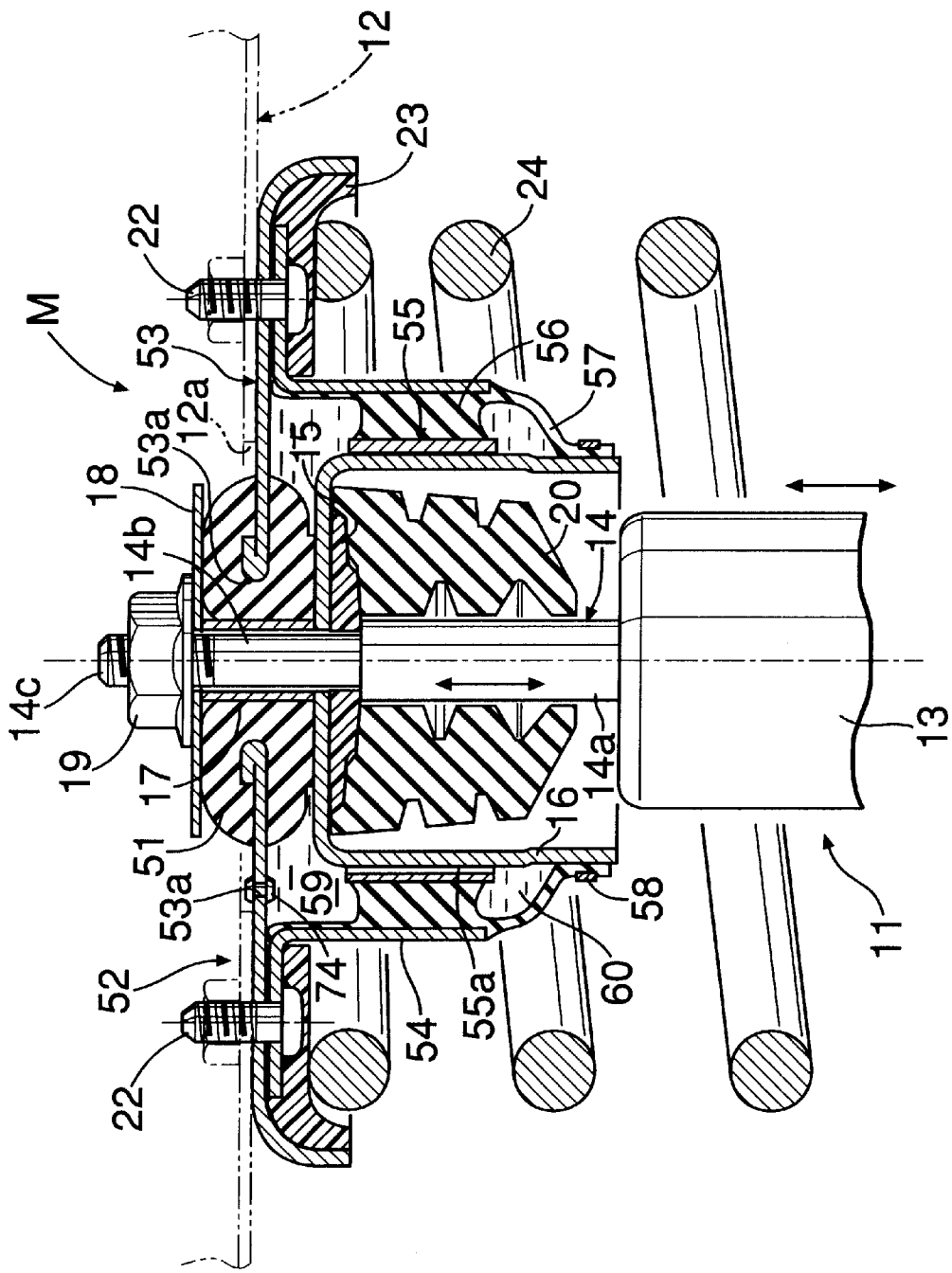
FIG. 6 is a vertical sectional view of a liquid-encapsulated damper mount according to a modification to the second embodiment.

FIG. 6 shows a modification to the second embodiment. The operating-liquid injecting bore 53b in the upper bracket section 53 is sealed by the press-fitting of the ball 66 (see FIG. 4) in the second embodiment, whereas the operating-liquid injecting bore 53b is sealed by a rivet 74 in the modification.

Figure 7:
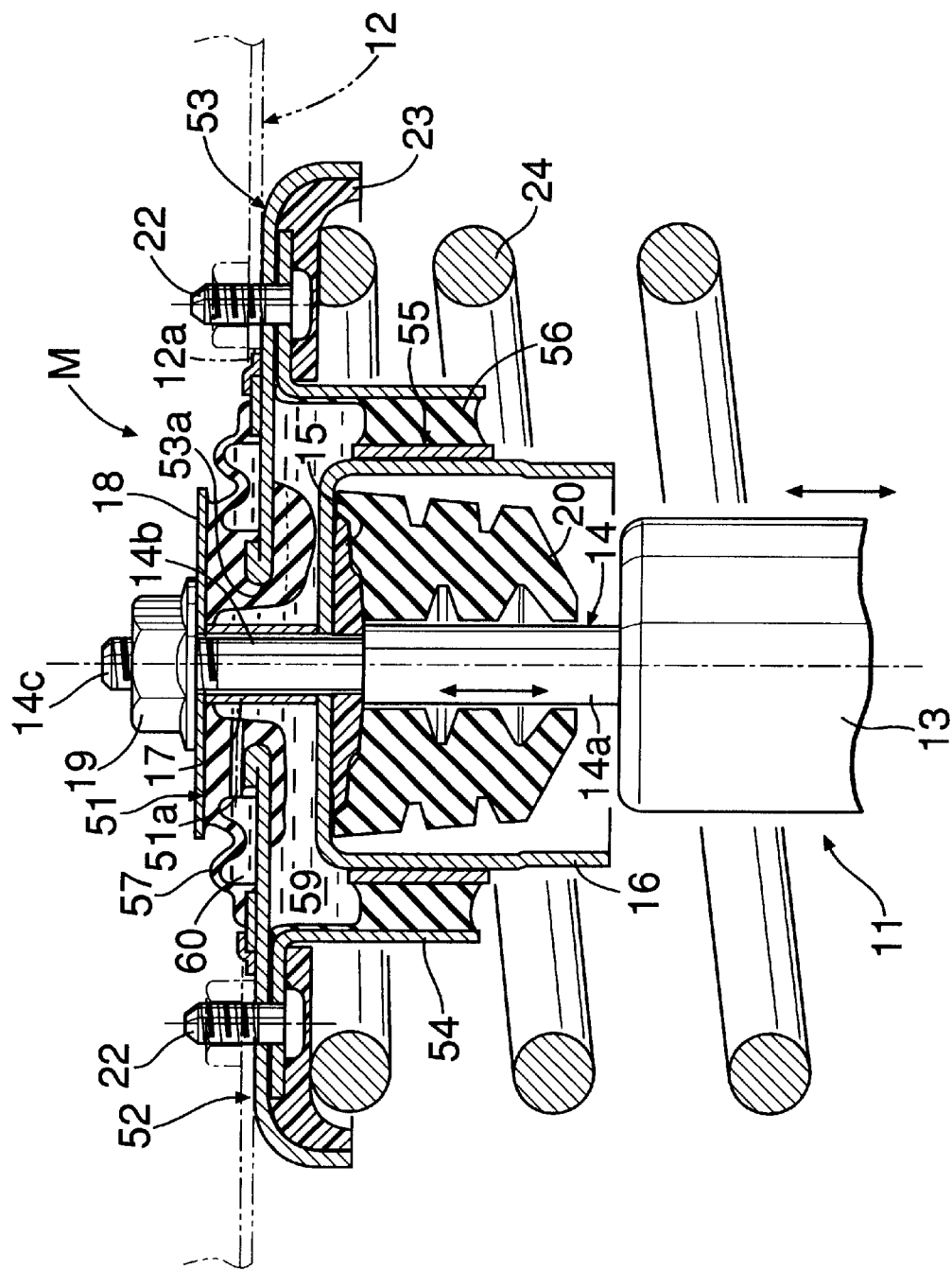
FIG. 7 is a vertical sectional view of a liquid-encapsulated damper mount according to a third embodiment of the present invention.

A third embodiment of the present invention will be described below with reference to FIG. 7.

In the second embodiment, the diaphragm 57 is provided integrally with the second elastic member 56, but in the third embodiment, the diaphragm 57 is provided integrally with a first elastic member 51. The first elastic member 51 is vulcanized to a portion of the upper bracket section 53 of the second bracket 52 in the vicinity to the opening 53a and to the lower surface of the washer 18, and the second liquid chamber 60 is defined on the upper surface of the upper bracket section 53 by the diaphragm 57. The first liquid chamber 59 and the second liquid chamber 60 communicate with each other through a communication passage 51a defined in the first elastic member 51.

Therefore, when a load is input from the wheel, a damping force is exhibited by the operating liquid passed through the communication passage 51a in addition to a damping force provided by the sheared deformation of the hydraulic damper 11 and the second elastic member 56. More specifically, when the damper rod 14 is offset upwards, the second elastic member 56 is deformed resiliently by a vertical shearing force to reduce the volume of the first liquid chamber 59. Therefore, the operating liquid forced out of the first liquid chamber 59 is passed through the communication passage 51a into the second liquid chamber 60 to expand the diaphragm 57. On the other hand, when the damper rod 14 is offset downwards, the second elastic member 56 is deformed resiliently by a vertical shearing force to increase the volume of the first liquid chamber 59. Therefore, the diaphragm 57 in the second liquid chamber 60 due to vacuum, whereby the operating liquid is passed through the communication passage 51a and drawn into the first liquid chamber 59. In this manner, the operating liquid in the first liquid chamber 59 or the second liquid chamber 60 is passed through the communication passage 51a alternately between the first liquid chamber 59 and the second liquid chamber 60 with the vertical movement of the damper rod 14, and at this time, the damping force is generated.

Thus, even according to the third embodiment, the function and the effect similar to those in the first and second embodiment can be exhibited. Particularly, the entire upper surface of the first bracket 16 functions as a piston and hence, the variation in volume of the first liquid chamber 59 can be increased to increase the damping force. Moreover, since the diaphragm 57 is disposed on the upper surface of the upper bracket section 53 of the second bracket 52, it is possible to prevent beforehand the diaphragm 57 from being damaged by s flying stone or the like within the wheel house.

Figure 8:
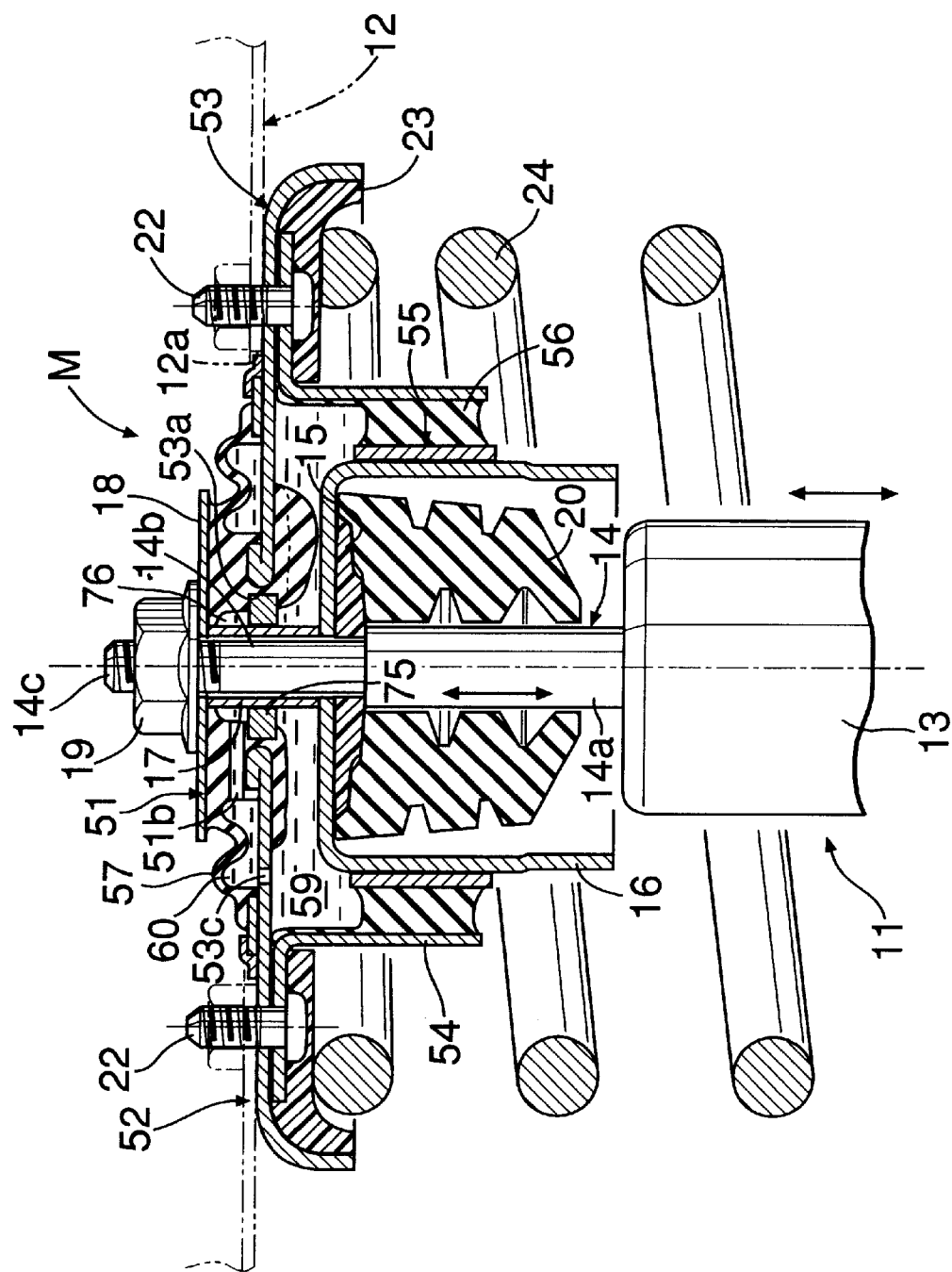
FIG. 8 is a vertical sectional view of a liquid-encapsulated damper mount according to a fourth embodiment of the present invention.

A fourth embodiment of the present invention will be described below with reference to FIG. 8.

The fourth embodiment is an improvement in the third embodiment. In the fourth embodiment, the first liquid chamber 59 and the second liquid chamber 60 communicate with each other through a communication passage 53c defined in the upper bracket section 53 of the second bracket 52. An annular seal member 75 mounted on the first elastic member 51 is slidably fitted over the outer peripheral surface of the collar 17, and an auxiliary second liquid chamber 76 defined in the upper portion of the collar 17 communicates with the second liquid chamber 60 through a passage 51b defined in the first elastic member 51.

Thus, when the damper rod 14 is offset upwards, the volume of the first liquid chamber 59 is reduced by the shear deformation of the second elastic member 56, while the volume of the auxiliary second liquid chamber 76 is increased. When the damper rod 14 is offset downwards, the volume of the first liquid chamber 59 is increased by the shear deformation of the second elastic member 56, while the volume of the auxiliary second liquid chamber 76 is reduced. Therefore, it is possible to minimize the variation in volume of the second liquid chamber 60 demarcated by the diaphragm 57 to alleviate the load of the diaphragm 57. The other function and effect in the fourth embodiment are the same as those in the third embodiment.

A fifth embodiment of the present invention will be described below with reference to FIG. 9.

Figure 9:
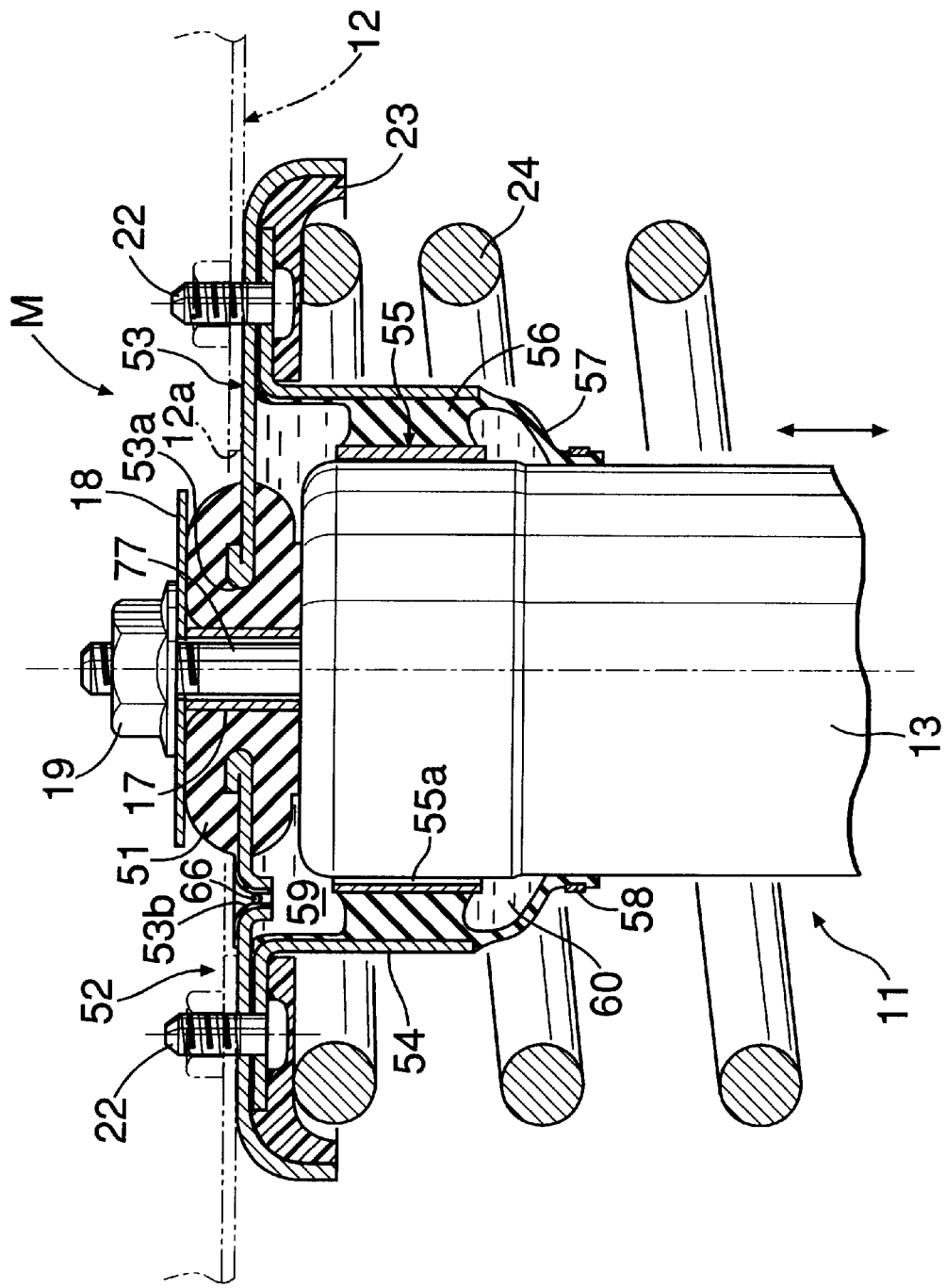
FIG. 9 is a vertical sectional view of a liquid-encapsulated damper mount according to a fifth embodiment of the present invention.

In the first embodiment shown in FIG. 2, the damper rod 14 protrudes upwards from the damper case 13 of the hydraulic damper 11, whereas in the fifth embodiment shown in FIG. 9, the hydraulic pressure damper 11 is mounted upside-down. Therefore, the first elastic member 51 is fitted over a support rod 77 fixed to the upper surface of the damper case 13 with the collar 17 interposed therebetween, and the washer 18 abutting against the upper surface of the first elastic member 51 is fastened by the nut 19. In the present embodiment, the damper case 13 and the support rod 77 are integral with each other and hence, the bump stopper 20 and the first bracket 16 are not required, and the collar 55 having the communication passage 55a provided therein is fixed directly to the outer peripheral surface of the damper case 13. Even according to the fifth embodiment, the function and effect similar to those in the first and second embodiments can be achieved.

Figure 10:
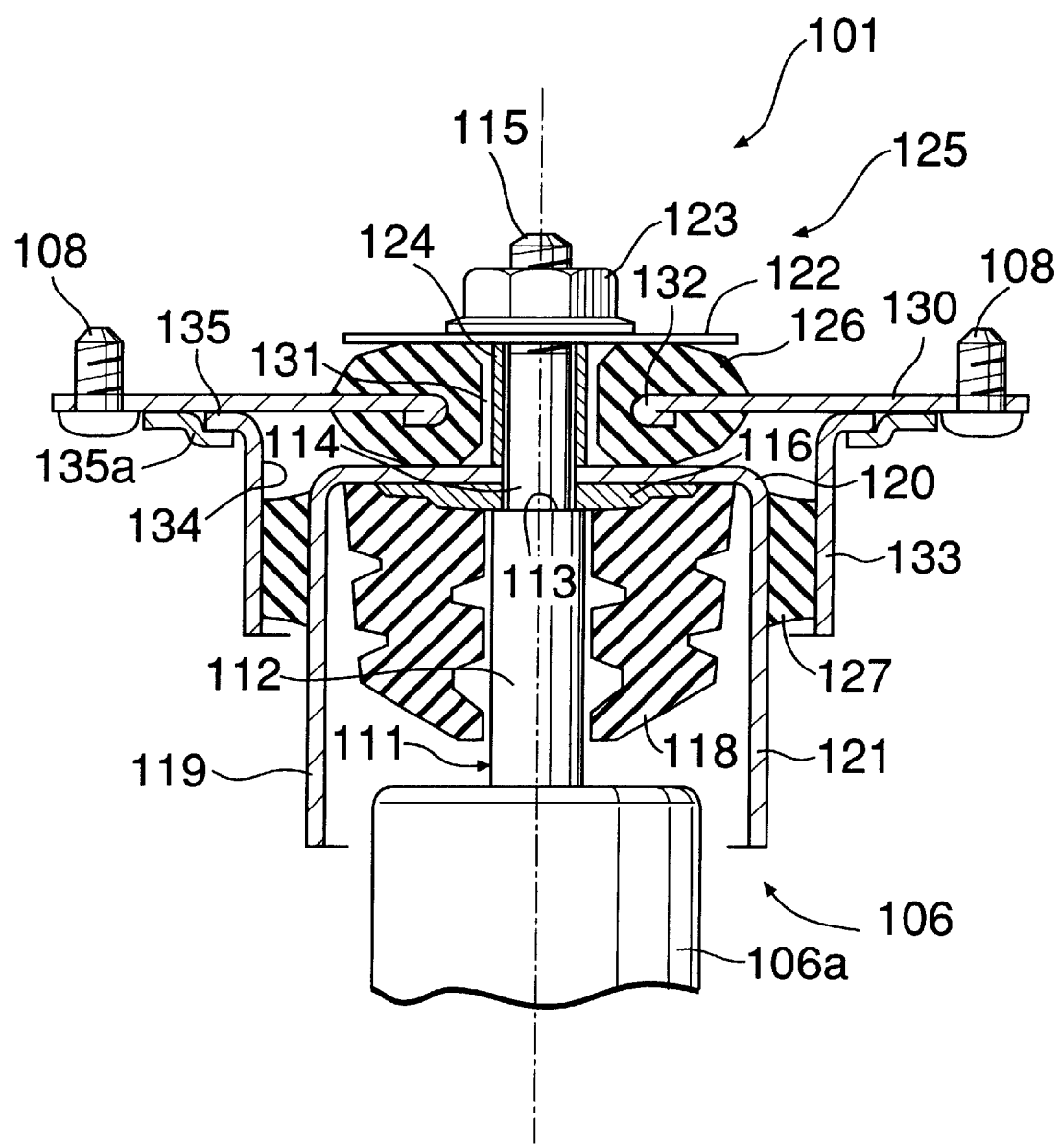
Figure 11:
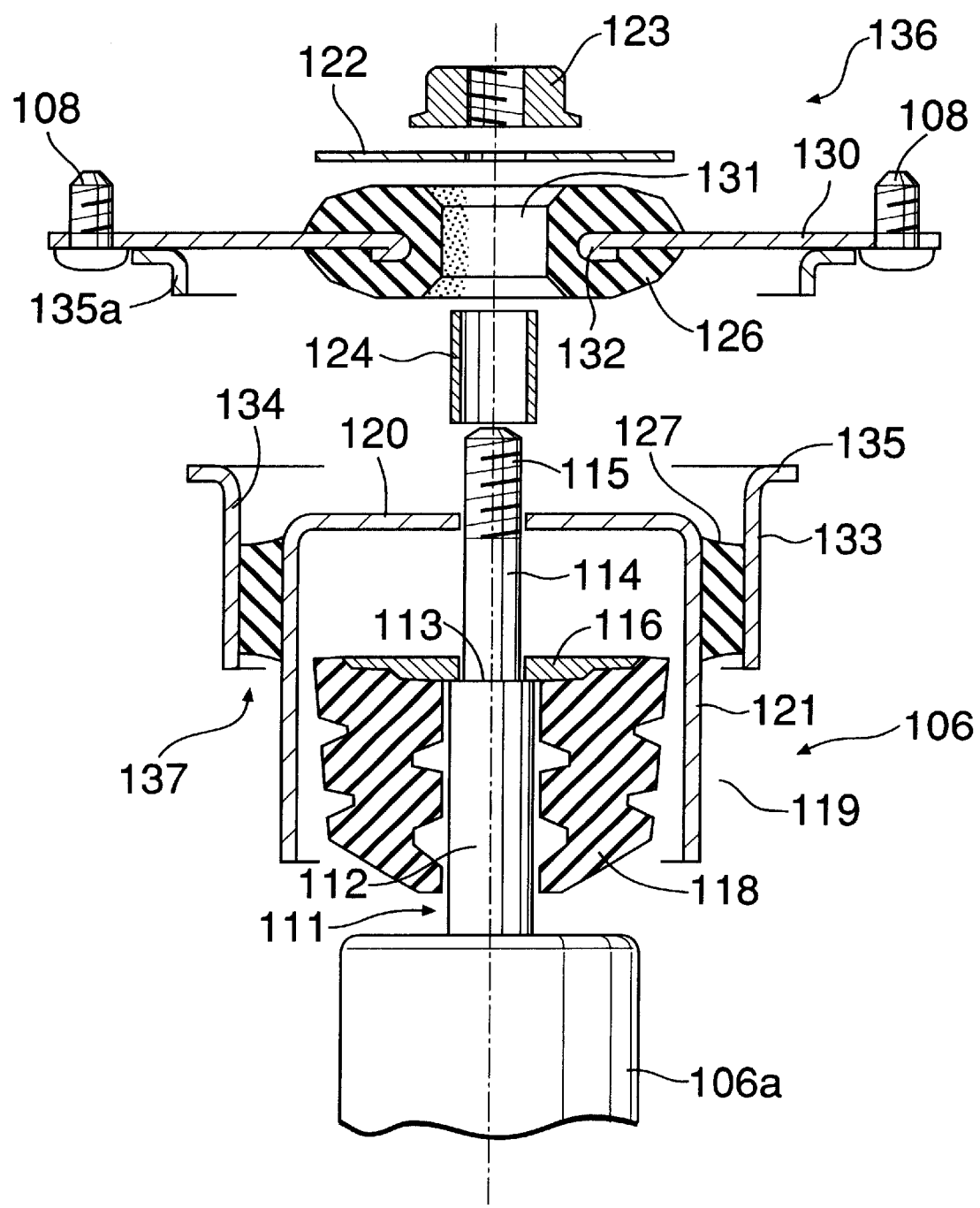
Figure 21:
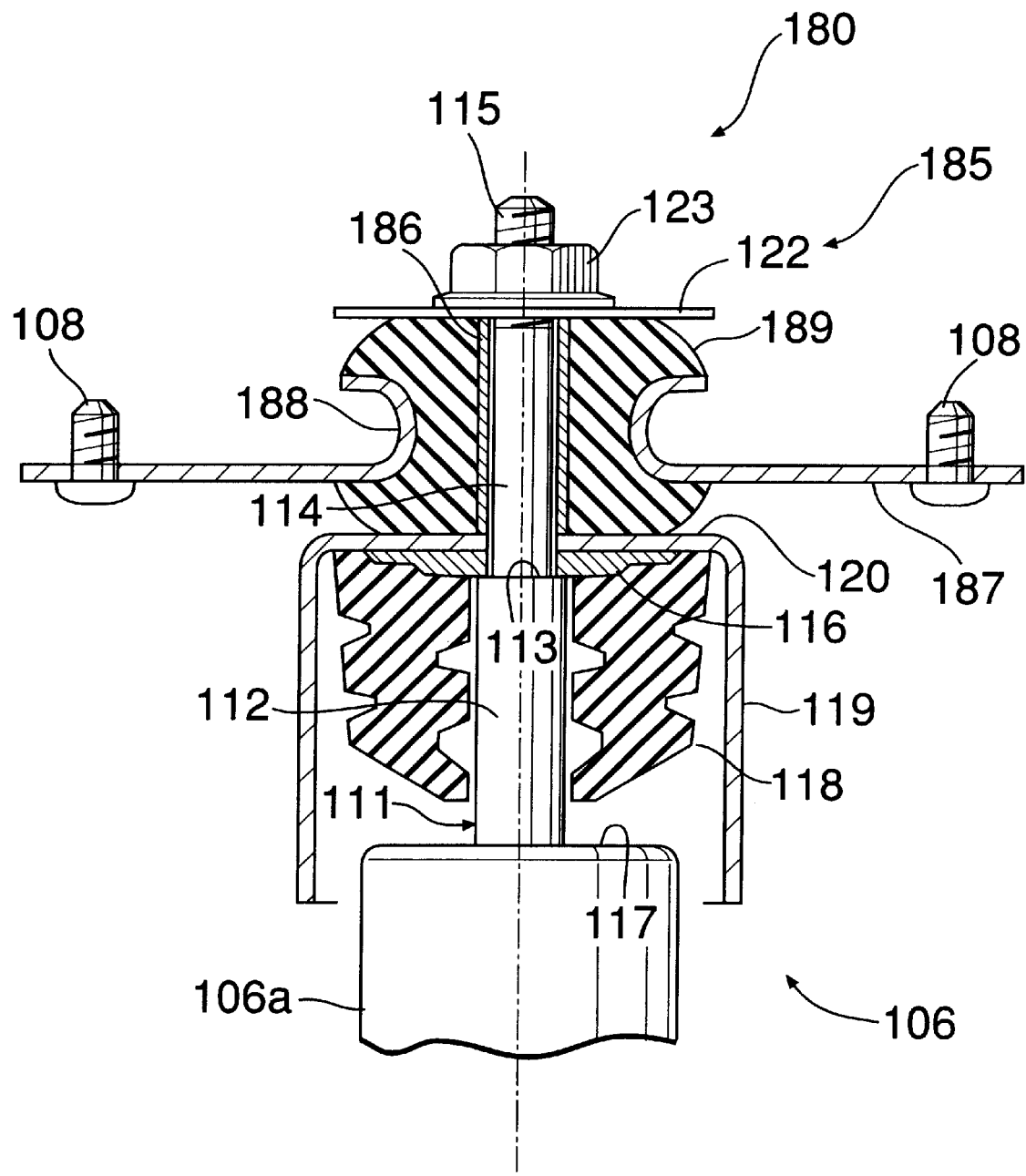
FIG. 21 is a vertical sectional view showing one example of a conventional structure of mounting of the conventional hydraulic damper to the vehicle body.

A sixth embodiment of the present invention will be described below with reference to FIGS. 10 and 11. In FIGS. 10 and 11, the same parts or components and portions as those used in the prior art mounting structure shown in FIG. 21 are designated by like reference characters, and the duplicated description is omitted.

A structure 101 for mounting of a hydraulic damper 106 to a vehicle body is shown in FIG. 10 and will be considered below. A damper mount 125 in the mounting structure 101 comprises a first rubber member 126 disposed above the hydraulic damper 106, and a second rubber member 127 disposed sideways of the hydraulic damper 106. Each of the first and second rubber members 126 and 127 is formed as an annular anti-vibration rubber member. The first rubber member is disposed surrounding an outer peripheral surface of a collar 124 fitted over a periphery of a smaller-diameter portion 114 of a piston rod 111, and the second rubber member surrounds an outer peripheral surface 121 of a dust cover 119 mounted to the piston rod 111.

The first rubber member 126 is sandwiched between a top surface 120 of the dust cover 119, constituting an axial end of the hydraulic damper 106, and a retaining plate 122 retained by a nut 124 threadedly fitted over an externally threaded portion 115 of the piston rod 111. The first rubber member 126 is formed in a state in which it envelopes vertically opposite surfaces of a mounting plate 130 mounted to the vehicle body by mounting bolts 108 from an inside of an opening 131 defined in the mounting plate 130 around the opening 131. The mounting plate 130 has a thickened portion 132 formed by folding back the mounting plate 131 around the opening 131, leading to an intensified engagement with the first rubber member 126, thereby preventing the withdrawal of the mounting plate 130. The collar 124 abuts against the dust cover 119 at its lower end, and against the retaining plate 122 at its upper end, to define a limit of axial compression of the first rubber member 126. The first rubber member 126 exhibits a function to transmit an axial load acting on the piston rod 111 of the hydraulic damper 106 through the mounting plate 130 with the vehicle body, to thereby retain an axial position.

The second rubber member 127 is bonded by vulcanization in a state in which it is sandwiched between the outer peripheral surface 121 of the dust cover 119, constituting an outermost periphery of the hydraulic damper 106, and an inner peripheral surface 134 of a cylindrical bracket 133 radially outside the outer peripheral surface 121 of the dust cover 119. The inner peripheral surface 134 of the cylindrical bracket 133 performs its role as a radial opposed portion on the side of the vehicle body. The bracket 133 has an upper flange portion 135 sandwiched by caulking a metal retainer piece 135a mounted to the mounting plate 130 by welding or the like, whereby the bracket 133 is fixed to the vehicle body. In this manner, the second rubber member 127 exhibits a function to transmit a radial load applied to the hydraulic damper 106 in a radial direction perpendicular to an axis of the hydraulic damper 106 through the bracket 133 with the vehicle body, to thereby retain a radial position.

Figure 22:
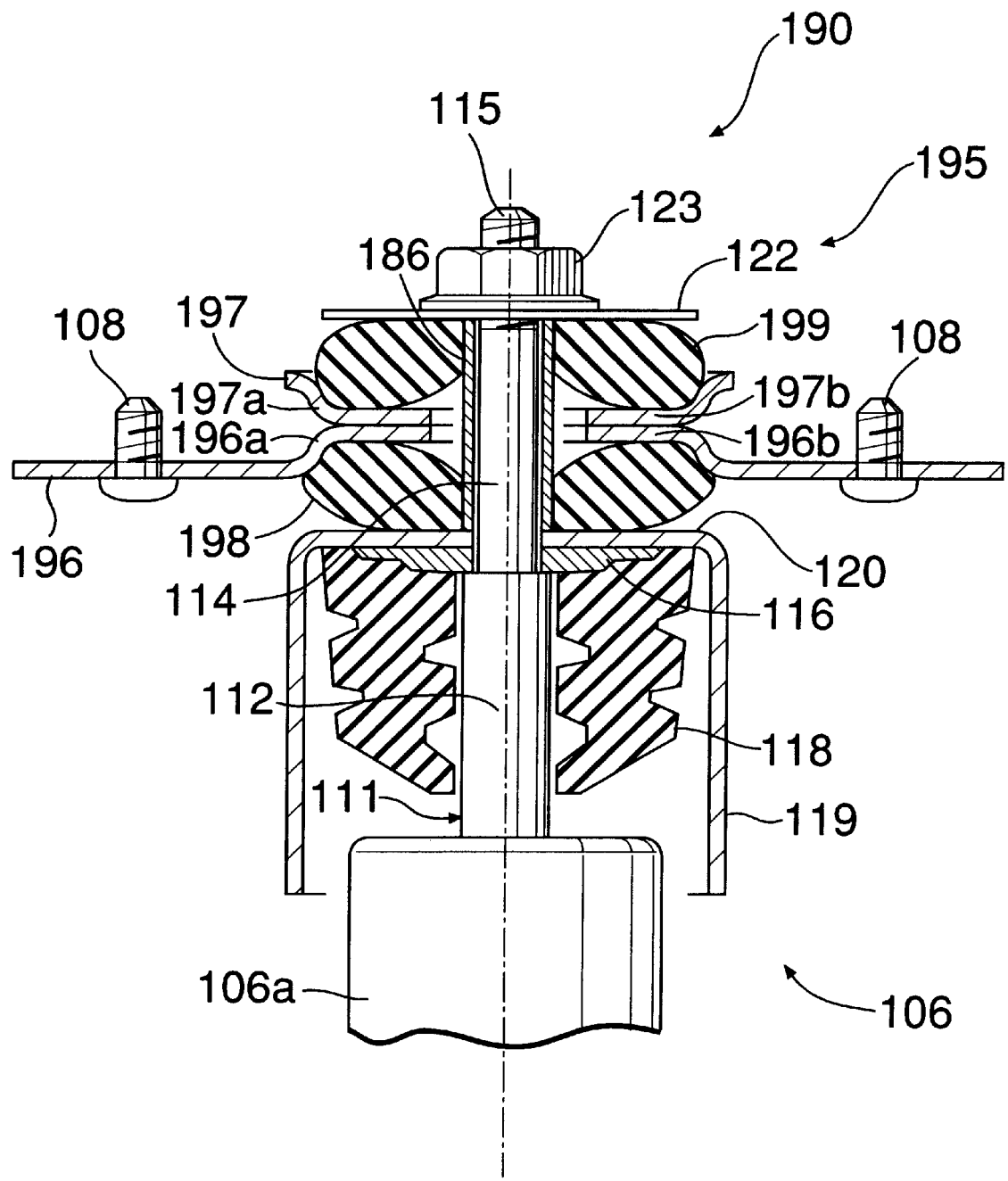
FIG. 22 is a vertical sectional view showing another example of the conventional structure of mounting of a conventional hydraulic damper to the vehicle body.

As can be seen from FIG. 10, the length of the collar 124 is remarkably decreased in comparison to the prior art, the height of the entire damper assembly, including the hydraulic damper 106 and the damper mount 125 is decreased, as compared with the collar 186 and the height of the conventional mounting structure 180, 190 shown in FIG. 21 or 22.

As a result, the height of a vehicle hood or bonnet can be decreased on a front side, and a cabin in the automobile can be widened on a rear side. In addition, the first rubber member 126 exhibiting the axial retaining function and the second rubber member 127 exhibiting the radial retaining function are produced separately and hence, spring rigidities in the axial and radial directions and the like can be regulated individually in accordance with required vibration-damping characteristics, leading to an increased degree of freedom of the regulation. Further, the drawing formation of the bracket 133 can be carried out prior to the assembling and hence, is easy to achieve, whereby the durability thereof is easy to enhance.

Referring to FIG. 11, for the first rubber member 126, a first rubber assembly 136 is previously fabricated along with the mounting plate 130 and the metal retainer piece 135a, and even for the second rubber member 127, a second rubber assembly 137 is previously fabricated, along with the dust cover 119 and the bracket 133. The assembling of a damper assembly comprising the hydraulic damper 106 and the damper mount 125 is as follows: First, the second rubber assembly 137 is fitted over the piston rod 111 of the hydraulic damper 106 having a locking member 116 and a bump stopper 118 previously incorporated therein; the collar 124 is fitted over the piston rod 111, and further, the first rubber assembly 136 is fitted outside the collar 124. Then, the retaining plate 122 is fitted over the piston rod 111, and the nut 123 is threaded fitted over the externally threaded portion 115 of the piston rod 111, whereby the damper assembly is completed and mounted to the vehicle body by the mounting bolts 108.

A seventh embodiment of the present invention will be described with reference to FIGS. 12 and 13. The seventh embodiment is not different from the sixth embodiment shown in FIGS. 10 and 11, except that a first rubber member 126 and a second rubber member 127 are formed integrally with each other and that the bracket 133 is mounted directly to the mounting plate 130. Therefore, components and portions corresponding to those in the sixth embodiment are designated by the same reference characters as those in FIG. 10, except for reference characters affixed specially, and the duplicated description is omitted.

Figure 12:
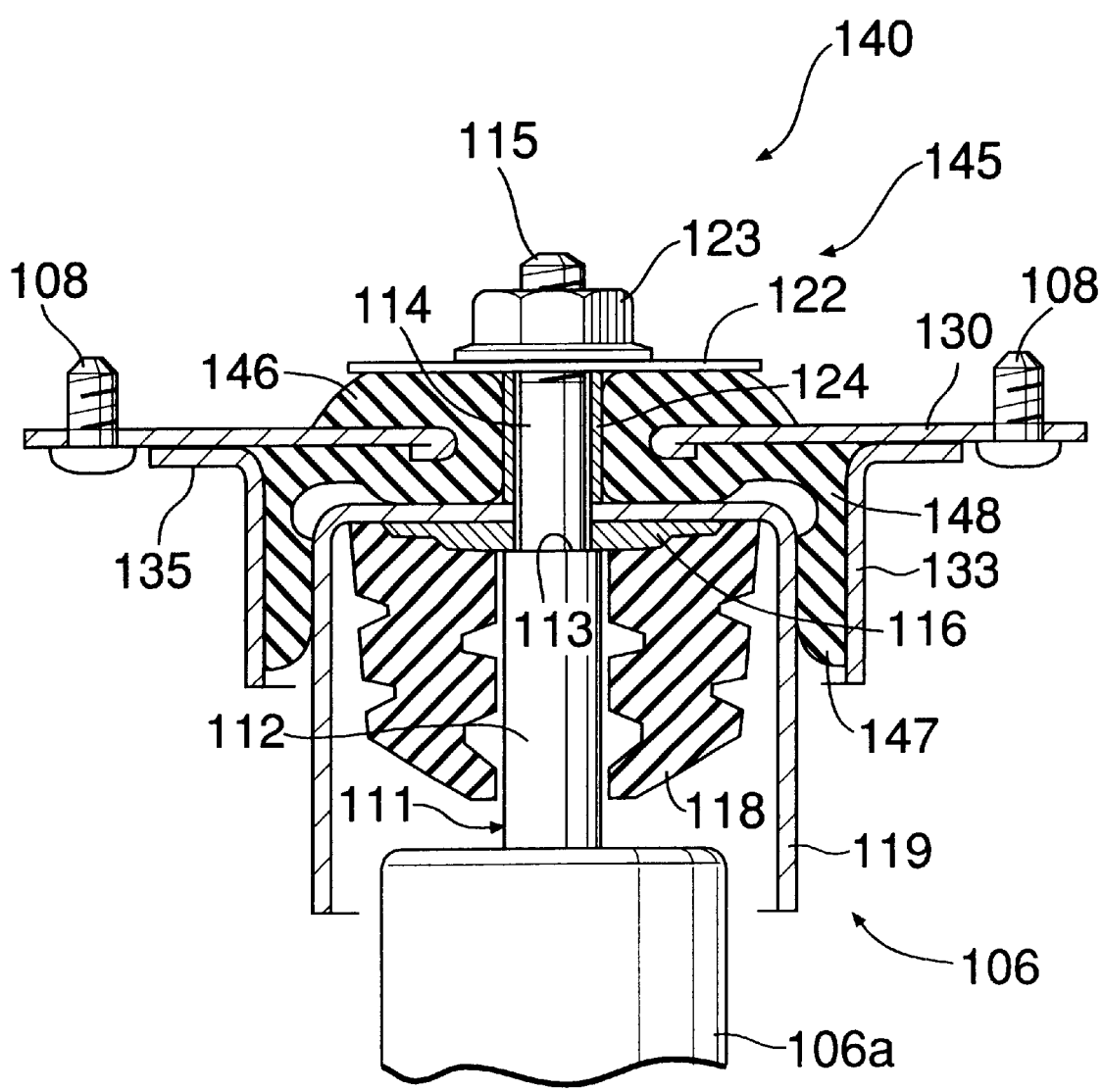
Figure 13:
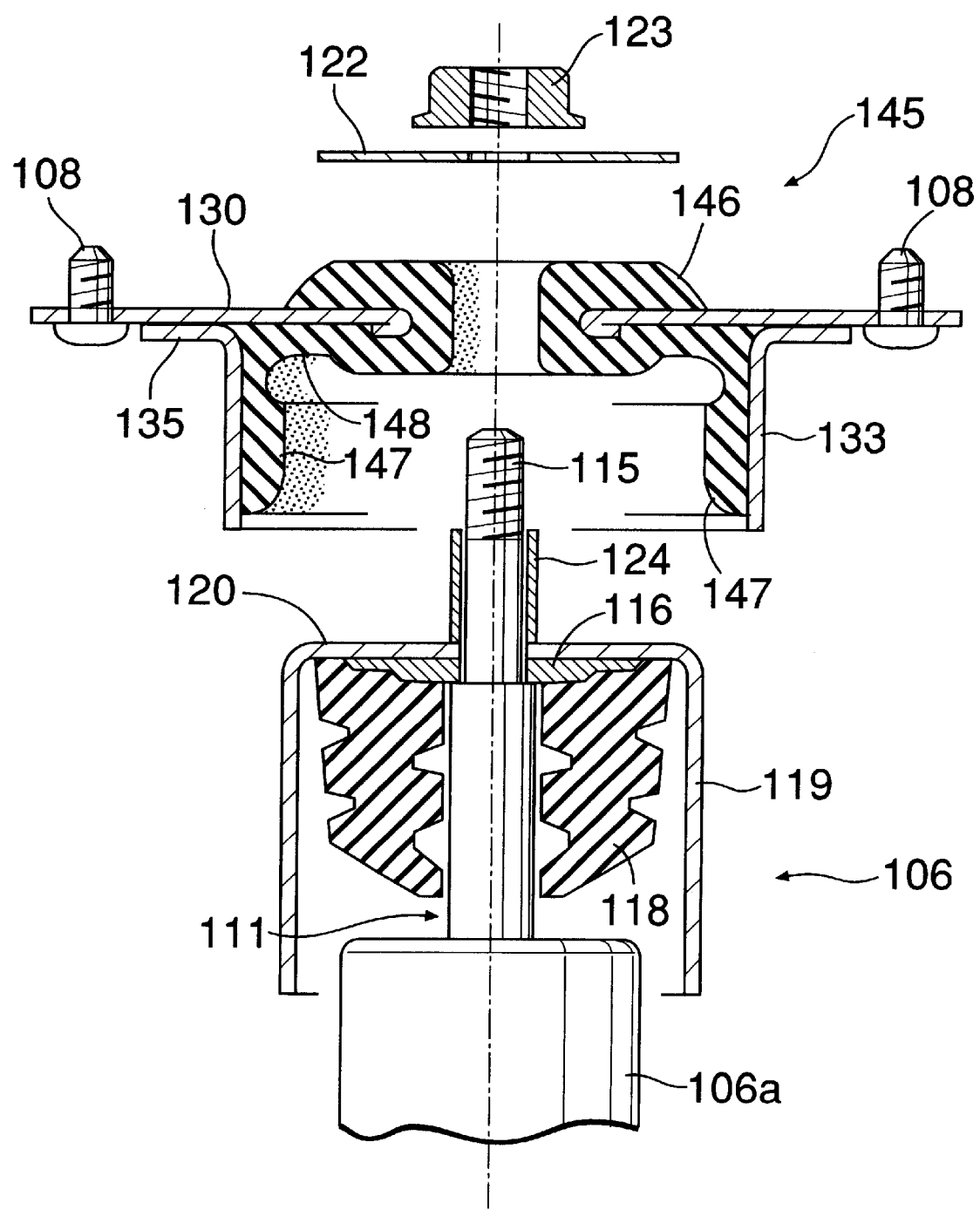

A damper mount 145 of a mounting structure shown in FIGS. 12 and 13 has a rubber member which is comprised of a first rubber portion 146 receiving an axial load and exhibiting a retaining function to retain an axial position, a second rubber portion 147 receiving a load in a diametric direction perpendicular to an axial direction and exhibiting a retaining function to retain a radial position, and a connecting portion 148 which connects the first and second rubber portions 146 and 147 integrally to each other. These rubber portions are bonded to the mounting plate 130 and the bracket 133 by means such as vulcanization and adhesion or the like. The bracket 133 is mounted at its flange portion 135 directly to the mounting plate 130 and hence, a caulking metal piece 135a as used in the sixth embodiment shown in FIGS. 10 and 11 is not required. The damper mount 145 is handled as one part and hence, the number of parts and cost are reduced as a whole. As shown in FIG. 13, the damper mount 145 is previously fabricated along with the mounting plate 130 and the bracket 133, and the damper assembly is assembled by pushing the first rubber portion 146 over the collar 124 previously fitted over the piston rod 111 and clamping the nut 123.

Figure 14:
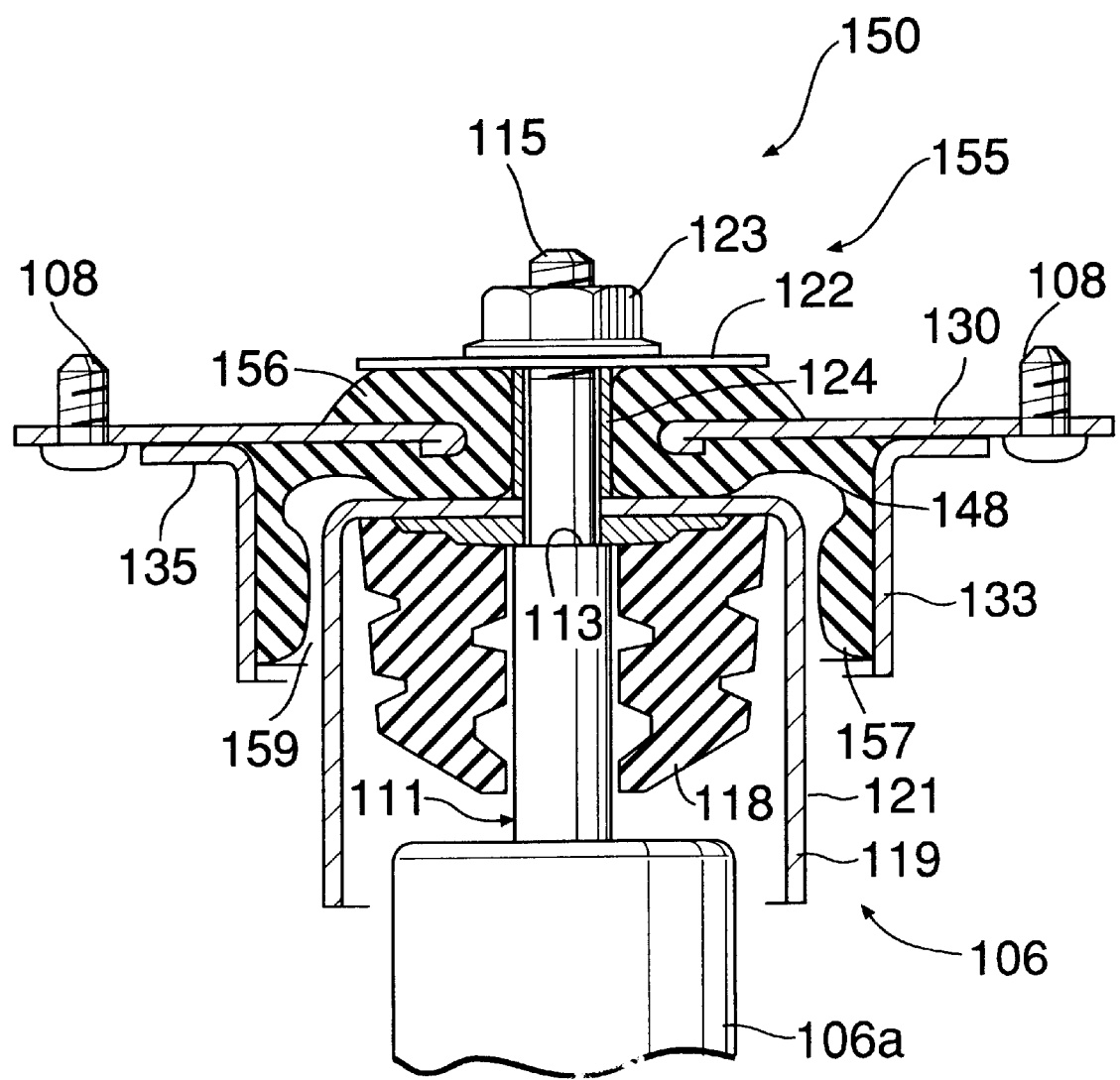
FIG. 14 is a vertical sectional view showing a structure of mounting of a hydraulic damper according to an eighth embodiment of the present invention.

An eighth embodiment of the present invention will be described below with reference to FIG. 14. A mounting structure 150 shown in FIG. 14 is not different from the seventh embodiment shown in FIG. 12, except that a clearance is defined between the second rubber portion of the damper mount and the dust cover. Therefore, components and portions corresponding to those in the sixth embodiment are designated by the same reference characters as those in FIG. 10, except for reference characters affixed specially, and the duplicated description is omitted.

In the mounting structure 150, one 157 of first and second rubber portions 156 and 157 constituting the damper mount 155, which exhibits a retaining function in a radial direction perpendicular to an axis, is disposed so that a clearance 159 is defined between the second rubber portion 157 and the outer peripheral surface of the dust cover 119. If such clearance is provided, a vibration-insulating state against an input such as a road noise in the radial direction perpendicular to the axis against is provided. Therefore, a fine vibration such as a road noise is not transmitted from a road surface to the vehicle body, whereby the riding comfort can be improved.

Figure 15:
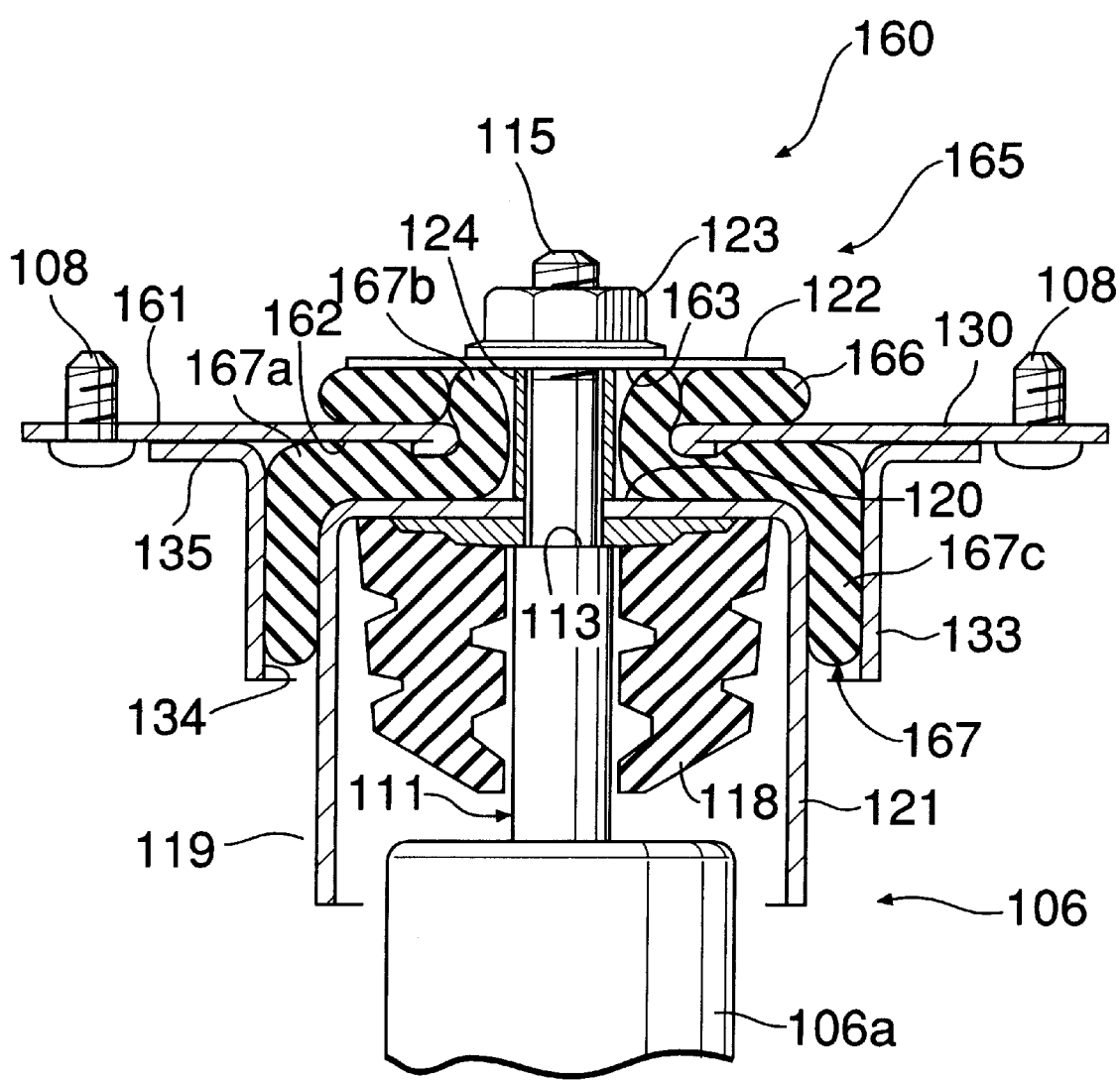
Figure 16:
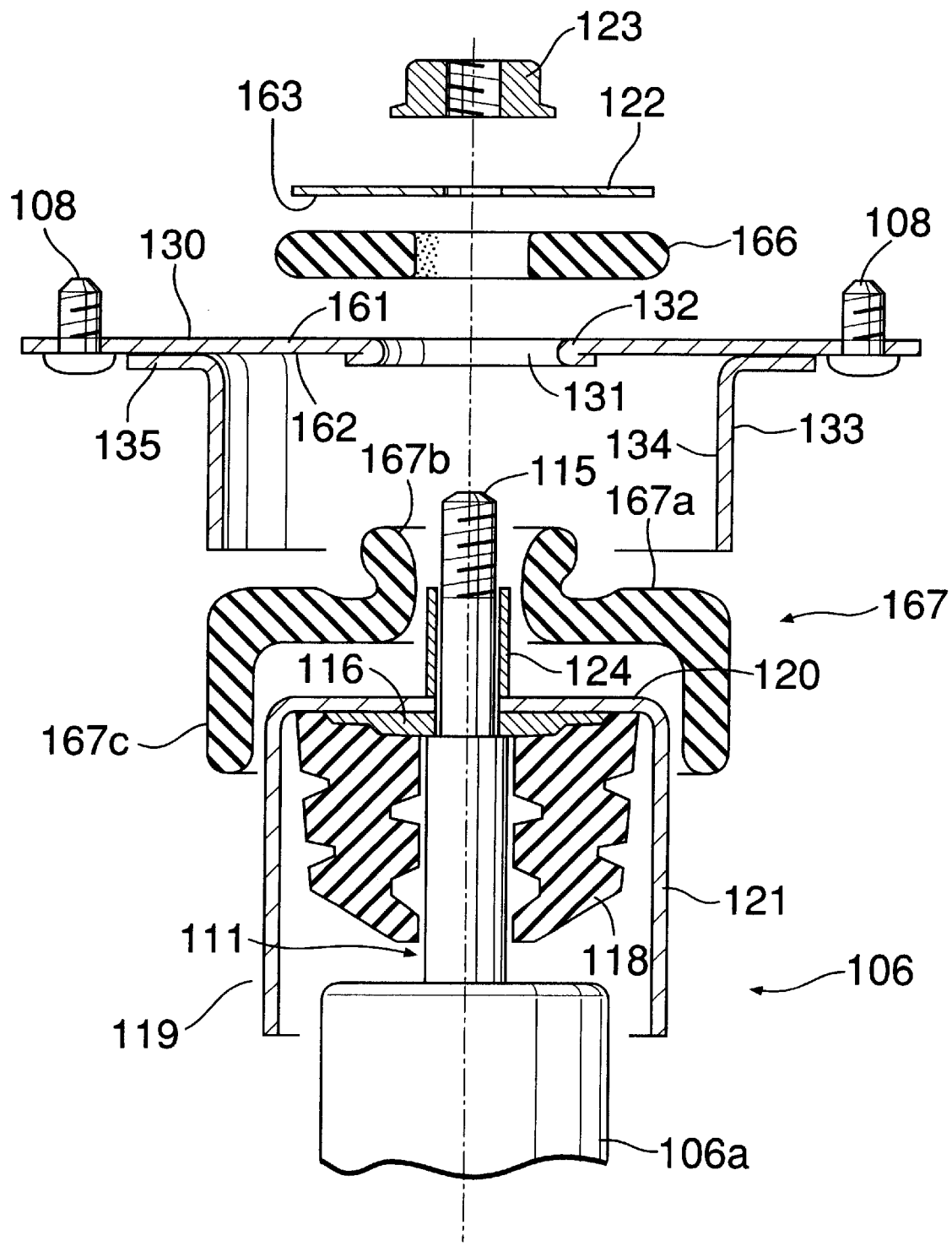

A ninth embodiment of the present invention will be described below with reference to FIGS. 15 and 16. A mounting structure shown in FIG. 15 is very similar to the mounting structure shown in FIG. 12, except that a rubber section of a damper mount is fabricated as a single rubber part without being bonded to the mounting plate and the bracket by a vulcanization and adhesion or the like. Therefore, components and portions corresponding to those in the sixth embodiment are designated by the same reference characters as those in FIG. 12, except for reference characters affixed specially, and the duplicated description is omitted.

The rubber section of the damper mount 165 in the mounting structure 160 comprises an upper rubber member 166 sandwiched between an upper surface 161 of the mounting plate 130 and a lower surface 163 of the retaining plate 122, and a lower rubber member 167 sandwiched between a lower surface 162 of the mounting plate 130 and the top surface 120 of the dust cover 119.

The lower rubber member 167 includes a main portion 167a, and a cylindrical portion 167b extending integrally with the main portion 167a sideways of the collar 124 and through the opening 131 in the mounting plate 130, a cylindrical portion 167c extending between the outer peripheral surface 121 of the dust cover 119 and the inner peripheral surface 134 of the bracket 133. Each of the upper and lower rubber members 166 and 167 is fabricated as a single rubber part without being bonded to the mounting plate 130 and the bracket 133 by a vulcanization, adhesion or the like. The upper rubber member 166 and the main portion 167a of the lower rubber member 167 receive an axial load and exhibit a retaining function to retain an axial position, and correspond to a first rubber member in the present invention. The cylindrical portions 167b and 167c of the lower rubber member 167 receive of a diametric load and exhibit a retaining function to retain a diametric position, and correspond to a second rubber member in the present invention. As shown in FIG. 16, the damper mount 165 is constructed in the following manner: the lower rubber member 167, the mounting plate 130 and the bracket 133, the upper rubber member 166 and the retaining plate 122 are fitted in the named order over the piston rod 111 of the hydraulic damper 106 having the collar 124 fitted thereon, and are clamped with an upper end of the cylindrical portion 167b of the lower rubber member 167 being press-fitted in the ring-shaped upper rubber member 166, by threadedly fitting the nut 123 over the externally threaded portion 115 of the piston rod 111. Thus, the damper assembly is assembled.

Figure 17:
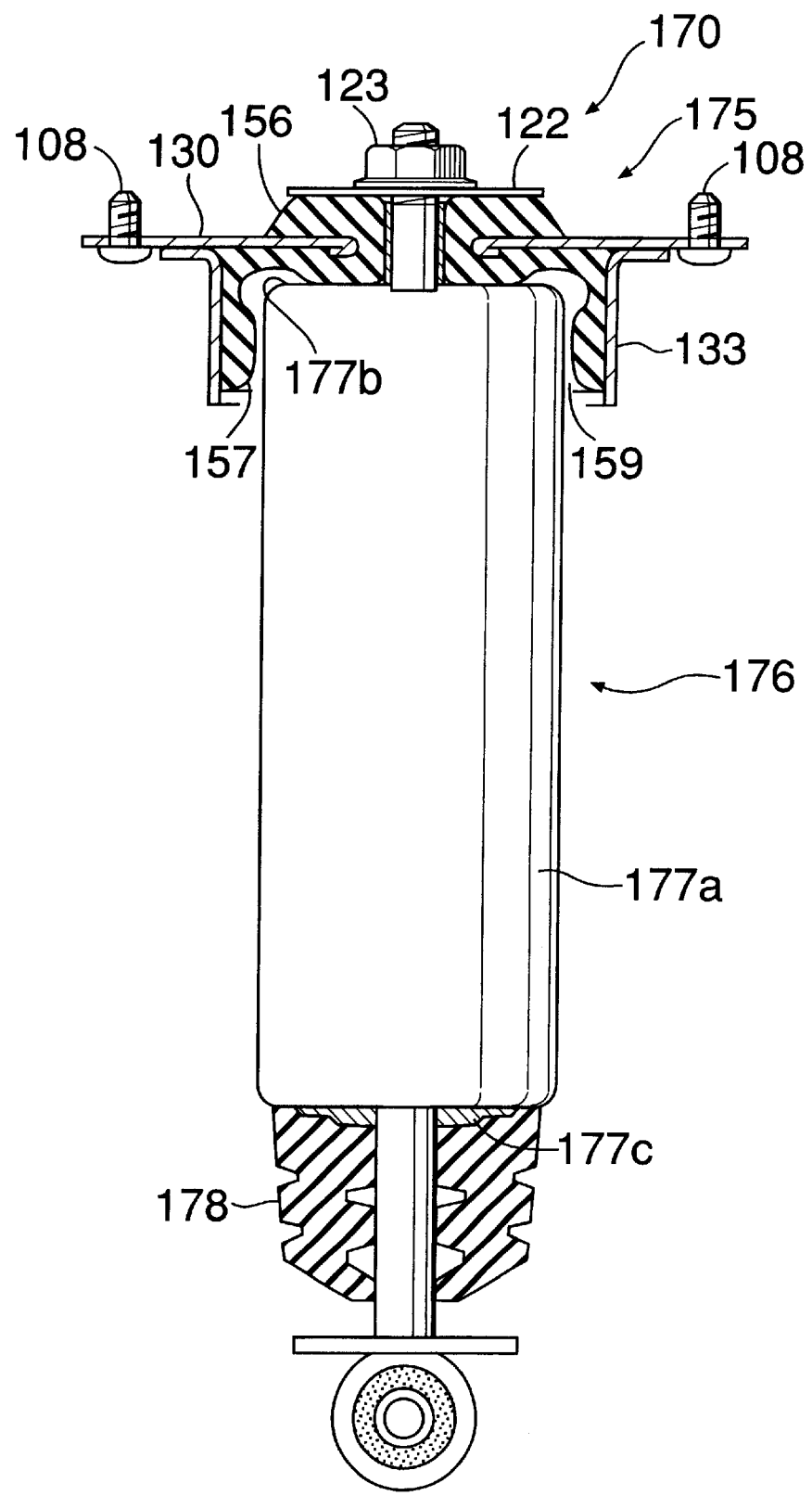
FIG. 17 is a vertical sectional view showing a structure of mounting of a hydraulic damper according to a tenth embodiment of the present invention.
Figure 18:
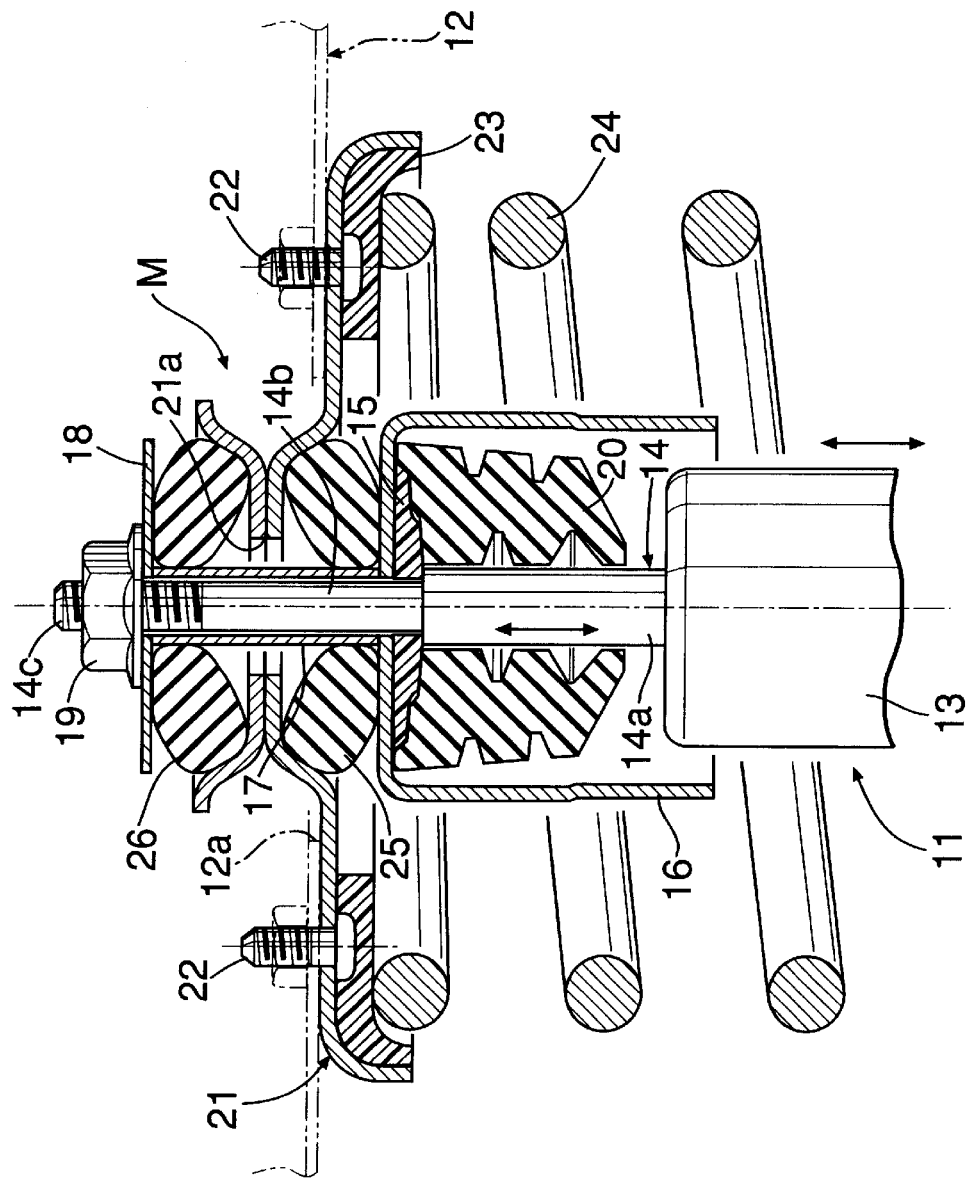
FIG. 18 is a vertical sectional view of the conventional damper mount.

A tenth embodiment of the present invention will be described below with reference to FIG. 17. A mounting structure 170 shown in FIG. 17 is different from the sixth to ninth embodiments shown in FIGS. 10 to 16 in respect of that a hydraulic damper is mounted in an inverted state to the vehicle body. A damper mount 175 in the mounting structure 170 has the same structure as the damper mount 155 shown in FIG. 14 and hence, components and portions corresponding to those in FIG. 14 are designated by the same reference characters as in FIG. 14, and the duplicated description is omitted.

As shown in FIG. 17, a hydraulic damper 176 is similar to the hydraulic damper 106 in each of the sixth to tenth embodiment, except that the latter is disposed in an inverted state. A bump stopper 178 is disposed on a lower surface 177c of a cylinder 177a. A first rubber portion 156 of the damper mount 175 is sandwiched between the retaining plate 122 and a top surface 177b of the cylinder 177a.

The damper mount M of the hydraulic damper 11 for the rear wheel has been illustrated in each if the first to fifth embodiments, but the present invention is applicable to a damper mount of a hydraulic damper for a front wheel.

In the sixth embodiment shown in FIG. 10, the second rubber member 127 has been described as being bonded to both of the outer peripheral surface 121 of the dust cover 119 and the inner peripheral surface 134 of the bracket 133, but the second rubber member 127 may be bonded to either one of the outer peripheral surface 121 of the dust cover 119 and the inner peripheral surface 134 of the bracket 133, and a clearance as provided in the eighth embodiment may be provided between the second rubber member 127 and the other of the outer peripheral surface 121 of the dust cover 119 and the inner peripheral surface 134 of the bracket 133.

Although the embodiments of the present invention have been described in detail, it will be understood that the present invention is not limited to the above-described embodiments, and various modifications in design may be made without departing from the spirit and scope of the invention defined in claims.

What is claimed is:

1. A structure for mounting a hydraulic damper used in a suspension of an automobile on a vehicle body, comprising a first rubber member disposed between an axial end of said hydraulic damper and the vehicle body and adapted to receive a load in an axial direction of said hydraulic damper, and a second rubber member disposed between an outer peripheral portion of said hydraulic damper and the vehicle body and adapted to receive a load in a radial direction perpendicular to an axis of said hydraulic damper, wherein a mounting plate is mounted to the vehicle body and has an opening provided herein for passage of said axial end of the hydraulic damper therethrough, said first rubber member being provided to envelope vertically opposed surfaces of the mounting plate around said opening and clamped between a retaining plate fixed to the axial end of the hydraulic damper and an upper wall portion of the hydraulic damper.

2. A structure for mounting a hydraulic damper according to claim 1, further comprising a first liquid chamber defined at least in part by the second rubber member, a second liquid chamber defined at least in part by a diaphragm, and a communication passage permitting said first and second liquid chambers to communicate with each other, wherein said second rubber member is formed into a tubular shape to surround said outer peripheral portion of said damper so that it is shear-deformed vertically with vertical movement of said damper relative to said mounting plate, to thereby increase and decrease the volume of said first liquid chamber.

3. A structure for mounting a hydraulic damper according to claim 2, wherein said diaphragm is located below said second rubber member and inside a suspension spring placed around an outer periphery of said damper.

4. A structure for mounting a hydraulic damper according to claim 1, wherein said first and second rubber members are formed integrally with each other.

5. A structure for mounting a hydraulic damper according to claim 1, wherein a clearance is defined between the outer peripheral portion of said hydraulic damper and said second rubber member.

6. A structure for mounting a hydraulic damper according to claim 1, wherein said second rubber member interconnects the outer peripheral portion of said hydraulic damper and the vehicle body.

7. A structure for mounting a hydraulic damper according to claim 1, wherein said second rubber member is bonded between the outer peripheral portion of said hydraulic damper and the vehicle body via vulcanization.

8. A structure for mounting a hydraulic damper according to claim 1, further including a mounting bracket adapted to be fixed to said vehicle body and having a portion surrounding the axial end of said hydraulic damper, and wherein said second rubber member is disposed between the outer peripheral portion of said hydraulic damper and the surrounding portion of said mounting bracket.

9. A structure for mounting a hydraulic damper according to claim 8, wherein said second rubber member interconnects the outer peripheral portion of said hydraulic damper and the surrounding portion of said mounting bracket.

10. A structure for mounting a hydraulic damper according to claim 8, wherein said second rubber member is bonded between the outer peripheral portion of said hydraulic damper and the surrounding portion of said mounting bracket via vulcanization.

11. A structure for mounting a hydraulic damper according to claim 1, further including a dust cover surrounding said axial end of said hydraulic damper, and wherein said second rubber member is disposed between the outer peripheral portion of said dust cover and the vehicle body.

12. A structure for mounting a hydraulic damper according to claim 11, further including a mounting bracket adapted to be fixed to said vehicle body and having a portion surrounding the axial end of said hydraulic damper, and wherein said second rubber member is disposed between the outer peripheral portion of said dust cover and the surrounding portion of said mounting bracket.

13. A structure for mounting a hydraulic damper according to claim 12, wherein said second rubber member interconnects the outer peripheral portion of said dust cover and the surrounding portion of said mounting bracket.

14. A structure for mounting a hydraulic damper according to claim 11, wherein said second rubber member interconnects the outer peripheral portion of said dust cover and the surrounding portion of said mounting bracket.

15. A structure for mounting a hydraulic damper according to claim 1, wherein said second rubber member is annular ring shaped.

16. A structure for mounting a hydraulic damper according to claim 15, wherein said annular ring shaped second rubber member has an inner diameter larger than an outer diameter of a damper case of said hydraulic damper.

17. A structure for mounting a hydraulic damper according to claim 1, further including a dust cover surrounding said axial end of said hydraulic damper and defining said upper wall portion, and a mounting bracket adapted to be fixed to said mounting plate and surrounding said dust cover, wherein said second rubber member interconnects the outer peripheral portion of said dust cover and the surrounding portion of said mounting bracket thereby forming an assembly, and in an assembled state, said assembly of the mounting bracket, the second rubber member and the dust cover is placed around said axial end of the hydraulic damper and fixed at its mounting bracket to said mounting plate with caulking.

18. A structure for mounting a hydraulic damper according to claim 17, further including a bump stopper disposed within said dust cover.

19. A structure for mounting a hydraulic damper according to claim 1, wherein said upper wall portion of sad hydraulic damper comprises an upper wall portion of a damper case of the hydraulic damper.

* * * * *

UNITED STATES PATENT AND TRADEMARK OFFICE
CERTIFICATE OF CORRECTION

PATENT NO. : 6,776,402 B2
DATED : August 17, 2004
INVENTOR(S) : Miyamoto et al.

It is certified that error appears in the above-identified patent and that said Letters Patent is hereby corrected as shown below:

Column 3,
Lines 27 and 28, between "a damping effect" and "by" change "provide" to
-- provided --.

Column 6,
Lines 29 and 30, between "Therefore," and "distance" change "The" to -- the --.

Column 8,
Line 33, between "4-2 extending" and "and by an" change "forwards" to -- forward --.

Column 10,
Lines 40 and 41, between "broken, there" and "not a possibility" insert -- is --.

Column 12,
Line 24, between "damaged by" and "flying stone" change "s" to -- a --.

Column 16,
Lines 20 and 21, between "illustrated in each" and "the first" change "if" to -- of --.

Column 18,
Line 39, at the end of the line directly after "wall portion of" change "sad" to -- said --.

Signed and Sealed this

Twenty-first Day of December, 2004

JON W. DUDAS
*Director of the United States Patent and Trademark Office*